US011240831B2

(12) United States Patent
Park et al.

(10) Patent No.: US 11,240,831 B2
(45) Date of Patent: Feb. 1, 2022

(54) SCHEDULING REQUEST OPERATION IN CONNECTED MODE DISCONTINUOUS RECEPTION

(71) Applicant: QUALCOMM Incorporated, San Diego, CA (US)

(72) Inventors: Sungwoo Park, San Diego, CA (US); Mostafa Khoshnevisan, San Diego, CA (US); Xiaoxia Zhang, San Diego, CA (US); Tao Luo, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 16/785,949

(22) Filed: Feb. 10, 2020

(65) Prior Publication Data

US 2020/0288488 A1    Sep. 10, 2020

Related U.S. Application Data

(60) Provisional application No. 62/815,269, filed on Mar. 7, 2019.

(51) Int. Cl.
*H04W 72/12* (2009.01)
*H04W 76/28* (2018.01)
(Continued)

(52) U.S. Cl.
CPC ..... *H04W 72/1268* (2013.01); *H04W 72/042* (2013.01); *H04W 72/14* (2013.01); *H04W 76/28* (2018.02); *H04W 80/02* (2013.01)

(58) Field of Classification Search
CPC ............. H04W 72/14; H04W 72/1268; H04W 72/042; H04W 76/28; H04W 80/02; H04B 7/0617; H04B 7/022
See application file for complete search history.

(56) References Cited

U.S. PATENT DOCUMENTS 10,666,334 B2    5/2020  Xiong et al.
2015/0312889 A1*  10/2015  Lee .................. H04L 1/188
                                                       370/280
(Continued)

FOREIGN PATENT DOCUMENTS

EP            3606257 A1    2/2020
WO    WO-2018094884 A1    5/2018
(Continued)

OTHER PUBLICATIONS

International Search Report and Written Opinion—PCT/US2020/017612—ISAEPO—dated May 8, 2020.
(Continued)

*Primary Examiner* — Wei Zhao
(74) *Attorney, Agent, or Firm* — QUALCOMM Incorporated

(57) ABSTRACT

Methods, systems, and devices for wireless communications are described. A user equipment (UE) may use one or more antenna subarrays to perform a scheduling request (SR) operation with one or more corresponding transmission reception points (TRPs) while operating in a connected discontinuous reception mode. In some implementations, the UE may receive a configuration indicating a set of its antenna subarrays and a corresponding set of the TRPs with which to perform the SR operation. Based on this configuration, the UE may transmit an SR to the set of TRPs using the set of its antenna subarrays, receive an uplink grant from at least one TRP of the set of TRPs, and transmit uplink data to the at least one TRP. Additionally or alternatively, the UE may determine the sets of antenna elements and TRPs for the SR operation autonomously and transmit an indication of this determination when transmitting the SR.

30 Claims, 20 Drawing Sheets

(51) Int. Cl.
*H04W 72/04* (2009.01)
*H04W 72/14* (2009.01)
*H04W 80/02* (2009.01)

(56) References Cited

U.S. PATENT DOCUMENTS

| | | |
|---|---|---|
| 2018/0049268 A1 | 2/2018 | Tenny et al. |
| 2018/0199360 A1 | 7/2018 | Lin et al. |
| 2018/0343686 A1* | 11/2018 | Manepalli ............. H04W 76/28 |
| 2019/0306909 A1* | 10/2019 | Zhou ....................... H04B 7/08 |

FOREIGN PATENT DOCUMENTS

| | | |
|---|---|---|
| WO | WO-2018160969 A1 | 9/2018 |
| WO | WO-2018174586 A1 | 9/2018 |

OTHER PUBLICATIONS

Samsung: "NR Connected DRX Operation with Beamforming", 3GPP Draft, 3GPP TSG-RAN WG2 Meeting #96, R2-168816 NR Connected DRX Operation with Beamforming, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 14, 2016-Nov. 18, 2016, Nov. 14, 2016 (Nov. 14, 2016), 5 Pages, XP051178384, Retrieved from the Internet: URL: http://www.3gpp.org/ftp/Meetings_3GPP_SYNC/RAN2/Docs/, [retrieved on Nov. 14, 2016].

* cited by examiner

SCHEDULING REQUEST OPERATION IN CONNECTED MODE DISCONTINUOUS RECEPTION

CROSS REFERENCE

The present application for patent claims the benefit of U.S. Provisional Patent Application No. 62/815,269 by PARK et al., entitled "SCHEDULING REQUEST OPERATION IN CONNECTED MODE DISCONTINUOUS RECEPTION," filed Mar. 7, 2019, assigned to the assignee hereof, and expressly incorporated herein.

BACKGROUND

The following relates generally to wireless communications, and more specifically to a scheduling request (SR) operation in connected mode discontinuous reception (DRX).

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may communicate with a base station (including, for example, via one or more transmission reception points (TRPs)) according to a connected DRX (CDRX) mode, where the UE transitions between sleep and awake states without receiving signaling to initiate the transitions based on the CDRX mode. During the awake states, the base station may transmit downlink information to the UE, and the UE may monitor a downlink channel (for example, for the downlink information). Additionally, when the UE detects uplink information to transmit to the base station, the UE may enter an awake state and transmit an SR to the base station during the awake state to request configuration information to subsequently transmit the uplink information (for example, in the same awake state or a different awake state). However, the UE may communicate with multiple TRPs (for example, associated with the same base station or with two or more different base stations) concurrently, which may cause complications when the UE is determining to which TRP the UE will transmit an SR for an uplink transmission.

SUMMARY

The described techniques relate to improved methods, systems, devices, and apparatuses that support scheduling request (SR) operations in a connected mode discontinuous reception (DRX). Generally, the described techniques provide for a user equipment (UE) using one or more antenna subarrays (which may also be referred to as, for example, panels or antenna panels) to perform an SR operation with one or more corresponding transmission reception points (TRPs). Such SR operations may be performed while the UE is operating in a mode providing for awake or active states that alternate with asleep or inactive states of the UE, such as in a connected DRX (CDRX) mode. In some implementations, the UE may receive, from a base station associated with the one or more TRPs, a configuration indicating a set of antenna subarrays of the UE, or a set of the TRPs, or both, with which the UE is to perform the SR operation. Based on this configuration, the UE may then transmit an SR to one or more TRPs of the set of TRPs using the set of antenna subarrays of the UE, receive an uplink grant from at least one TRP of the set of TRPs based on the SR transmission, and transmit uplink data to the at least one TRP based on receiving the uplink grant.

In some implementations, the set of antenna elements, or the set of the TRPs, or both, may be selected dynamically (for example, by the UE) or semi-statically (for example, by one of the TRPs and signaled to the UE with the indicated configuration). Additionally or alternatively, the UE may determine the sets of antenna subarrays, the set of TRPs, or both, for the SR operation and then transmit an indication of the determined sets (e.g., as a preferred configuration) when transmitting the SR. The UE may receive an uplink grant that is based on the indication transmitted with the SR and transmit uplink data based on the uplink grant (and the indication in some implementations).

A method of wireless communication at a UE is described. The method may include receiving a configuration indicating a set of antenna subarrays of the UE, or a set of TRPs, or a combination thereof, for the UE to use to communicate while operating in a DRX mode; transmitting, based on the received configuration, an SR while operating in the DRX mode; receiving an uplink grant in response to the transmitted SR; and transmitting uplink data based on the received uplink grant and the received configuration.

An apparatus for wireless communication at a UE is described. The apparatus may include a processor, memory in electronic communication with the processor, and instructions stored in the memory. The instructions may be executable by the processor to cause the apparatus to receive a configuration indicating a set of antenna subarrays of the UE, or a set of TRPs, or a combination thereof, for the UE to use to communicate while operating in a DRX mode; transmit, based on the received configuration, an SR while operating in the DRX mode; receive an uplink grant in response to the transmitted SR; and transmit uplink data based on the received uplink grant and the received configuration.

Another apparatus for wireless communication at a UE is described. The apparatus may include means for receiving a configuration indicating a set of antenna subarrays of the UE, or a set of TRPs, or a combination thereof, for the UE to use to communicate while operating in a DRX mode; transmitting, based on the received configuration, an SR while operating in the DRX mode; receiving an uplink grant in response to the transmitted SR; and transmitting uplink data based on the received uplink grant and the received configuration.

A non-transitory computer-readable medium storing code for wireless communication at a UE is described. The code may include instructions executable by a processor to receive a configuration indicating a set of antenna subarrays of the UE, or a set of TRPs, or a combination thereof, for the UE to use to communicate while operating in a DRX mode; transmit, based on the received configuration, an SR while operating in the DRX mode; receive an uplink grant in response to the transmitted SR; and transmit uplink data based on the received uplink grant and the received configuration.

In some examples of the method, apparatuses, and non-transitory computer-readable medium described herein, transmitting the SR may include operations, features, means, or instructions for transmitting the SR to multiple TRPs using multiple antenna subarrays of the UE, where the set of TRPs includes the multiple TRPs and the set of antenna subarrays of the UE includes the multiple antenna subarrays.

In some examples of the method, apparatuses, and non-transitory computer-readable medium described herein, transmitting the SR may include operations, features, means, or instructions for transmitting the SR using the set of antenna subarrays indicated by the received configuration, the set of antenna subarrays including a subset of a set of antenna subarrays of the UE.

In some examples of the method, apparatuses, and non-transitory computer-readable medium described herein, receiving the configuration may include operations, features, means, or instructions for receiving the configuration in one or more of radio resource control (RRC) signaling, downlink control information (DCI), or a medium access control (MAC) control element (MAC-CE).

Some examples of the method, apparatuses, and non-transitory computer-readable medium described herein may further include operations, features, means, or instructions for selecting, by the UE, at least one antenna subarray of a set of antenna subarrays of the UE to use to perform one or more of transmitting the SR, receiving the uplink grant, or transmitting the uplink data.

In some examples of the method, apparatuses, and non-transitory computer-readable medium described herein, receiving the uplink grant in response to the transmitted SR may include operations, features, means, or instructions for receiving, from a first TRP of the set of TRPs, the uplink grant for the first TRP in response to the transmitted SR; and receiving, from a second TRP of the set of TRPs, an uplink grant for the second TRP in response to the transmitted SR.

In some examples of the method, apparatuses, and non-transitory computer-readable medium described herein, the set of TRPs may include operations, features, means, or instructions for receiving, from each TRP of the set of TRPs, an uplink grant for the TRP in response to the transmitted SR.

In some examples of the method, apparatuses, and non-transitory computer-readable medium described herein, the SR may be transmitted to a first TRP of the set of TRPs, and the uplink grant may be received from the first TRP in response to the transmitted SR.

In some examples of the method, apparatuses, and non-transitory computer-readable medium described herein, the set of TRPs may include operations, features, means, or instructions for transmitting uplink data to each of the set of TRPs.

In some examples of the method, apparatuses, and non-transitory computer-readable medium described herein, transmitting the uplink data may include operations, features, means, or instructions for identifying one or more TRPs of the set of TRPs as having transmitted an uplink grant in response to the transmitted SR and transmitting, based on the identifying, uplink data to the one or more TRPs.

In some examples of the method, apparatuses, and non-transitory computer-readable medium described herein, the SR may be transmitted on an uplink control channel, the uplink grant may be received on a downlink control channel, and the uplink data may be transmitted on an uplink shared channel.

A method of wireless communication at a UE is described. The method may include transmitting, while operating in a DRX mode, an SR including an indication of a set of antenna subarrays of the UE, or a set of TRPs, or a combination thereof; receiving an uplink grant in response to the transmitted SR; and transmitting uplink data based on the received uplink grant and the indication in the transmitted SR.

An apparatus for wireless communication at a UE is described. The apparatus may include a processor, memory in electronic communication with the processor, and instructions stored in the memory. The instructions may be executable by the processor to cause the apparatus to transmit, while operating in a DRX mode, an SR including an indication of a set of antenna subarrays of the UE, or a set of TRPs, or a combination thereof; receive an uplink grant in response to the transmitted SR; and transmit uplink data based on the received uplink grant and the indication in the transmitted SR.

Another apparatus for wireless communication at a UE is described. The apparatus may include means for transmitting, while operating in a DRX mode, an SR including an indication of a set of antenna subarrays of the UE, or a set of TRPs, or a combination thereof; receiving an uplink grant in response to the transmitted SR; and transmitting uplink data based on the received uplink grant and the indication in the transmitted SR.

A non-transitory computer-readable medium storing code for wireless communication at a UE is described. The code may include instructions executable by a processor to transmit, while operating in a DRX mode, an SR including an indication of a set of antenna subarrays of the UE, or a set of TRPs, or a combination thereof; receive an uplink grant in response to the transmitted SR; and transmit uplink data based on the received uplink grant and the indication in the transmitted SR.

In some examples of the method, apparatuses, and non-transitory computer-readable medium described herein, the set of TRPs may include operations, features, means, or instructions for transmitting, based on the received uplink grant and the indication in the transmitted SR, uplink data to the set of TRPs.

In some examples of the method, apparatuses, and non-transitory computer-readable medium described herein, transmitting the uplink data to the set of TRPs may include operations, features, means, or instructions for transmitting the uplink data to the set of TRPs using multiple antenna subarrays of the UE, the set of antenna subarrays including the multiple antenna subarrays.

In some examples of the method, apparatuses, and non-transitory computer-readable medium described herein, the SR may be transmitted using a second antenna subarray of the set of antenna subarrays of the UE, the second antenna subarray different than a first antenna subarray of the set of antenna subarrays used to transmit the uplink data.

In some examples of the method, apparatuses, and non-transitory computer-readable medium described herein, receiving the uplink grant in response to the transmitted SR may include operations, features, means, or instructions for receiving the uplink grant using the set of antenna subarrays of the UE indicated in the transmitted SR.

In some examples of the method, apparatuses, and non-transitory computer-readable medium described herein, the set of antenna subarrays may include a second antenna subarray different than a first antenna subarray of the set of antenna subarrays used to transmit the uplink data.

In some examples of the method, apparatuses, and non-transitory computer-readable medium described herein, the set of antenna subarrays may include a set of antenna subarrays.

Some examples of the method, apparatuses, and non-transitory computer-readable medium described herein may further include operations, features, means, or instructions for determining a channel quality associated with each of the set of TRPs and determining the set of TRPs based on the determined channel quality, where the transmitted SR indicates the determined set of TRPs.

Some examples of the method, apparatuses, and non-transitory computer-readable medium described herein may further include operations, features, means, or instructions for determining a channel quality associated with each of the set of antenna subarrays of the UE and determining the set of antenna subarrays based on the determined channel quality, where the transmitted SR indicates the determined set of antenna subarrays.

In some examples of the method, apparatuses, and non-transitory computer-readable medium described herein, the SR may be transmitted on an uplink control channel, the uplink grant may be received on a downlink control channel, and the uplink data may be transmitted on an uplink shared channel.

A method of wireless communication at a base station is described. The method may include transmitting, to a UE, a configuration indicating a set of antenna subarrays of the UE, or a set of TRPs, or a combination thereof, for the UE to use to communicate while operating in a DRX mode; receiving an SR from the UE based on the transmitted configuration; transmitting, to the UE, an uplink grant in response to the received SR; and receiving uplink data from the UE based on the transmitted uplink grant.

An apparatus for wireless communication at a base station is described. The apparatus may include a processor, memory in electronic communication with the processor, and instructions stored in the memory. The instructions may be executable by the processor to cause the apparatus to transmit, to a UE, a configuration indicating a set of antenna subarrays of the UE, or a set of TRPs, or a combination thereof, for the UE to use to communicate while operating in a DRX mode; receive an SR from the UE based on the transmitted configuration; transmit, to the UE, an uplink grant in response to the received SR; and receive uplink data from the UE based on the transmitted uplink grant.

Another apparatus for wireless communication at a base station is described. The apparatus may include means for transmitting, to a UE, a configuration indicating a set of antenna subarrays of the UE, or a set of TRPs, or a combination thereof, for the UE to use to communicate while operating in a DRX mode; receiving an SR from the UE based on the transmitted configuration; transmitting, to the UE, an uplink grant in response to the received SR; and receiving uplink data from the UE based on the transmitted uplink grant.

A non-transitory computer-readable medium storing code for wireless communication at a base station is described. The code may include instructions executable by a processor to transmit, to a UE, a configuration indicating a set of antenna subarrays of the UE, or a set of TRPs, or a combination thereof, for the UE to use to communicate while operating in a DRX mode; receive an SR from the UE based on the transmitted configuration; transmit, to the UE, an uplink grant in response to the received SR; and receive uplink data from the UE based on the transmitted uplink grant.

In some examples of the method, apparatuses, and non-transitory computer-readable medium described herein, receiving the SR may include operations, features, means, or instructions for receiving the SR via multiple TRPs, where each of the set of TRPs monitor for SRs from the UE.

In some examples of the method, apparatuses, and non-transitory computer-readable medium described herein, receiving the SR may include operations, features, means, or instructions for receiving the SR via one TRP of the set of TRPs, where each of the set of TRPs monitor for SRs from the UE.

In some examples of the method, apparatuses, and non-transitory computer-readable medium described herein, receiving the SR may include operations, features, means, or instructions for identifying an anchor TRP of the set of TRPs, where the anchor TRP monitors for SRs from the UE, and receiving the SR via the anchor TRP.

In some examples of the method, apparatuses, and non-transitory computer-readable medium described herein, transmitting the configuration may include operations, features, means, or instructions for transmitting the configuration in one or more of RRC signaling, DCI, or a MAC CE.

Some examples of the method, apparatuses, and non-transitory computer-readable medium described herein may further include operations, features, means, or instructions for transmitting, via a second TRP of the set of TRPs in response to the received SR, a second uplink grant for the second TRP.

In some examples of the method, apparatuses, and non-transitory computer-readable medium described herein, the SR may be received via a first TRP of the set of TRPs, and the uplink grant may be transmitted via the first TRP in response to the received SR.

Some examples of the method, apparatuses, and non-transitory computer-readable medium described herein may further include operations, features, means, or instructions for determining to refrain from transmitting an uplink grant via a second TRP of the set of TRPs based on determining that the base station failed to receive a second SR via the second TRP.

In some examples of the method, apparatuses, and non-transitory computer-readable medium described herein, receiving the uplink data may include operations, features, means, or instructions for receiving uplink data via each of multiple TRPs, where the set of TRPs includes the multiple TRPs.

In some examples of the method, apparatuses, and non-transitory computer-readable medium described herein, receiving the uplink data may include operations, features, means, or instructions for identifying one or more TRPs of the set of TRPs as having transmitted an uplink grant in response to the received SR and receiving, based on the identifying, uplink data from the UE via the one or more TRPs.

In some examples of the method, apparatuses, and non-transitory computer-readable medium described herein, the SR may be received on an uplink control channel, the uplink grant may be transmitted on a downlink control channel, and the uplink data may be received on an uplink shared channel.

A method of wireless communication at a base station is described. The method may include receiving an SR from a UE operating in a DRX mode, the SR including an indication of a set of antenna subarrays of the UE, or a set of TRPs, or a combination thereof; transmitting an uplink grant to the UE in response to the received SR; and receiving uplink data based on the transmitted uplink grant and the indication in the received SR.

An apparatus for wireless communication at a base station is described. The apparatus may include a processor, memory in electronic communication with the processor, and instructions stored in the memory. The instructions may be executable by the processor to cause the apparatus to receive an SR from a UE operating in a DRX mode, the SR including an indication of a set of antenna subarrays of the UE, or a set of TRPs, or a combination thereof; transmit an uplink grant to the UE in response to the received SR; and receive uplink data based on the transmitted uplink grant and the indication in the received SR.

Another apparatus for wireless communication at a base station is described. The apparatus may include means for receiving an SR from a UE operating in a DRX mode, the SR including an indication of a set of antenna subarrays of the UE, or a set of TRPs, or a combination thereof; transmitting an uplink grant to the UE in response to the received SR; and receiving uplink data based on the transmitted uplink grant and the indication in the received SR.

A non-transitory computer-readable medium storing code for wireless communication at a base station is described. The code may include instructions executable by a processor to receive an SR from a UE operating in a DRX mode, the SR including an indication of a set of antenna subarrays of the UE, or a set of TRPs, or a combination thereof; transmit an uplink grant to the UE in response to the received SR; and receive uplink data based on the transmitted uplink grant and the indication in the received SR.

In some examples of the method, apparatuses, and non-transitory computer-readable medium described herein, receiving the uplink data may include operations, features, means, or instructions for receiving, based on the transmitted uplink grant and the indication in the received SR, uplink data from the UE via multiple TRPs, the set of TRPs including the multiple TRPs.

In some examples of the method, apparatuses, and non-transitory computer-readable medium described herein, the SR may be received via a second TRP of the set of TRPs different than a first TRP of the set of TRPs used to receive the uplink data.

In some examples of the method, apparatuses, and non-transitory computer-readable medium described herein, transmitting the uplink grant in response to the received SR may include operations, features, means, or instructions for transmitting the uplink grant via at least one of the set of TRPs indicated in the received SR.

Some examples of the method, apparatuses, and non-transitory computer-readable medium described herein may further include operations, features, means, or instructions for determining one TRP of the set of TRPs indicated in the received SR, where the uplink grant is transmitted via the determined one TRP.

Some examples of the method, apparatuses, and non-transitory computer-readable medium described herein may further include operations, features, means, or instructions for determining multiple TRPs of the set of TRPs indicated in the received SR, where the uplink grant is transmitted via the determined multiple TRPs.

In some examples of the method, apparatuses, and non-transitory computer-readable medium described herein, the indicated set of TRPs may be determined based on a channel quality associated with one or more of each of the set of TRPs or the set of antenna subarrays.

In some examples of the method, apparatuses, and non-transitory computer-readable medium described herein, the indicated set of antenna subarrays may be determined based on a channel quality associated with one or more of each of the set of TRPs or the set of antenna subarrays.

In some examples of the method, apparatuses, and non-transitory computer-readable medium described herein, the SR may be received on an uplink control channel, the uplink grant may be transmitted on a downlink control channel, and the uplink data may be received on an uplink shared channel.

DETAILED DESCRIPTION

Figure 1:
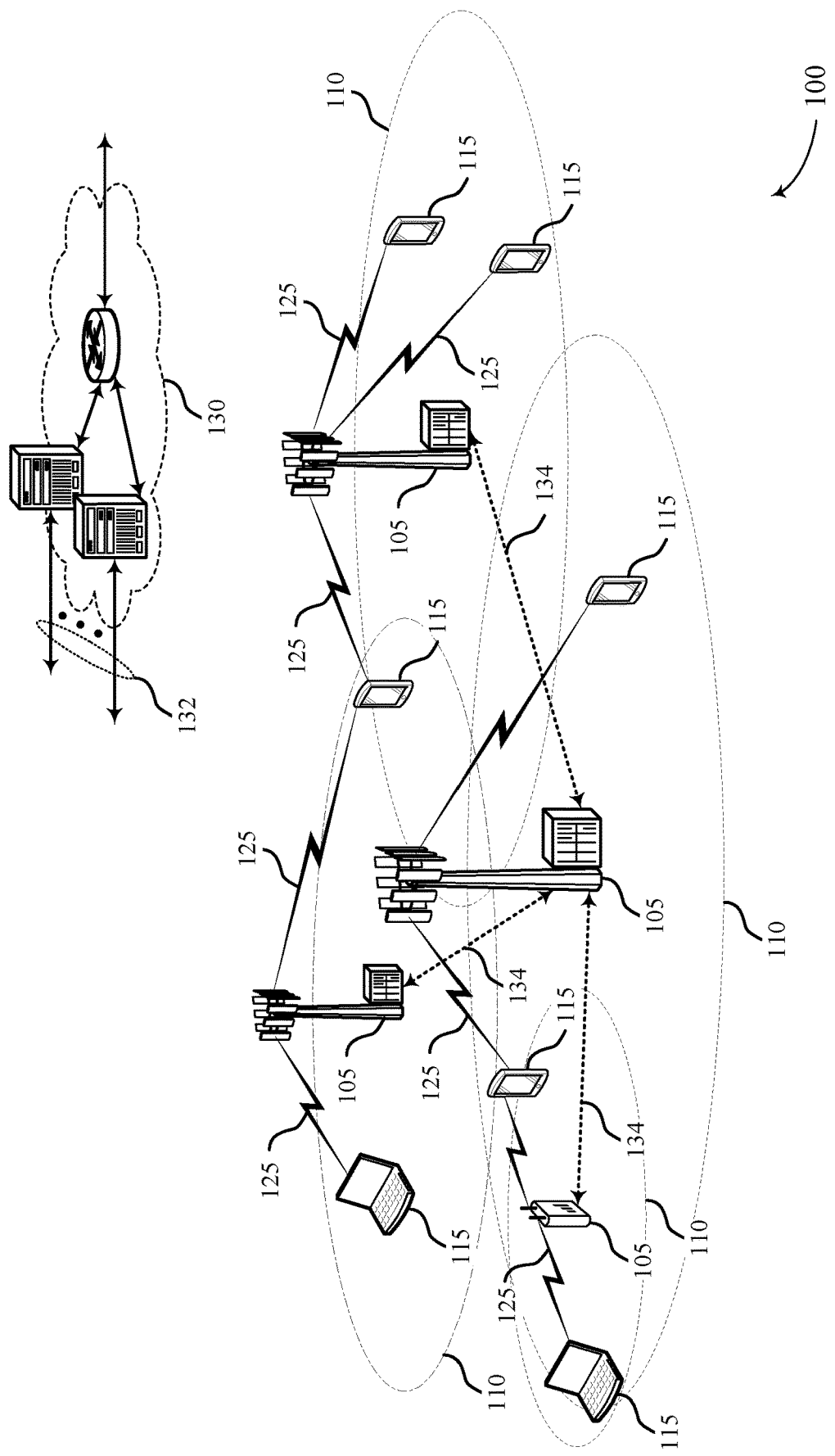
FIG. 1 illustrates an example of a wireless communications system that supports a scheduling request (SR) operation in connected mode discontinuous reception (DRX) in accordance with aspects of the present disclosure.

In some wireless communications systems, a user equipment (UE) may communicate with one or more transmission reception points (TRPs) (for example, associated with the same base station or with two or more different base stations) concurrently via one or more antenna subarrays (which may also be referred to as, for example, panels or antenna panels) according to a mode providing for alternating awake (or active) and sleep (or inactive) states, such as a connected mode of a discontinuous reception (DRX) cycle. In some implementations, the UE may use separate antenna subarrays (that is, sets of antennas used, for example, for beamforming, transmit diversity, receive diversity, or multiple-input multiple-output (MIMO) communications) for the communications with the TRPs based on, for example, corresponding orientations of the antenna subarrays or physical locations of the antenna subarrays on the UE. In a connected DRX (CDRX) mode (for example, the connected mode of a DRX cycle), the UE may transition between sleep and awake states signal-free (that is, without signaling from one of the TRPs to wake up the UE). During the awake states, one or more of the TRPs may transmit downlink information such as control or data to the UE on one or more downlink channels, and the UE may accordingly monitor the downlink channels for incoming downlink information from the TRPs (for example, using corresponding antenna subarrays associated with the TRPs).

Additionally or alternatively, if the UE detects that the UE has uplink information such as data to transmit, the UE may perform a scheduling request (SR) operation to request resources and configuration information for subsequently transmitting the uplink data. For example, the SR operation may include the UE transmitting an SR via an uplink channel to one of the TRPs, the TRP transmitting an uplink grant via a downlink channel to the UE, and the UE transmitting the uplink data via an uplink channel on resources as indicated in the uplink grant. However, as described above, the UE may communicate with multiple TRPs concurrently, which may complicate the SR operation based on the UE not knowing with which TRP to perform the SR operation.

As described herein, a first TRP (that is, any one of the one or more TRPs the UE has connected to) may transmit configuration information about which antenna subarrays to use when transmitting an SR, which of the TRPs to perform a future SR operation with (for example, which TRPs will transmit an uplink grant), and which antenna subarrays to use when transmitting the uplink data for the SR, or a combination thereof. In some implementations, the configuration information may include an indication of resources to use for the SR transmission of the SR operation, for receiving the uplink grant, for transmitting the uplink grant, or a combination thereof.

Based on the configuration information, the UE may transmit the SR using each antenna subarray to respective TRPs, using a subset of the antenna subarrays of the UE, or using one antenna subarray to a corresponding TRP. In some implementations, the one subarray may be selected dynamically (for example, selected by a base station or TRP that signals the selection via downlink control information (DCI) or a medium access control (MAC) control element (MAC-CE) or selected by the UE) or semi-statically (for example, by a base station or TRP that signals the selection via radio resource control (RRC) signaling). The respective TRPs or the corresponding TRP may then transmit an uplink grant to the UE based on receiving the SR. That is, if the UE transmits an SR using each antenna subarray to the respective TRPs, each of the TRPs may transmit a separate uplink grant, and if the UE transmits one SR, the corresponding TRP that receives the SR may transmit an uplink grant to the UE. Additionally, the UE may then transmit the uplink data using the antenna subarrays on which the UE transmitted the SR and the antenna subarrays that received the uplink grant.

In other implementations, the UE may autonomously determine one or more TRP-antenna subarray pairs for transmitting the uplink data and transmit an indication of the determined TRP-antenna subarray pair(s) with the SR. For example, the UE may transmit this indication to a first TRP, receive an uplink grant from the first TRP or the TRPs indicated in the TRP-antenna subarray pairs, and transmit the uplink data to the determined TRPs of the TRP-antenna subarray pairs.

Aspects of the disclosure are initially described in the context of a wireless communications system. Additionally, aspects of the disclosure are illustrated by an additional wireless communications system, examples of SR operations, and process flow examples. Aspects of the disclosure are further illustrated by and described with reference to apparatus diagrams, system diagrams, and flowcharts that relate to SR operation in connected mode DRX.

FIG. 1 illustrates an example of a wireless communications system 100 that supports SR operation in CDRX mode in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some implementations, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some implementations, UEs 115 may be designed to support critical functions (for example, mission critical functions), and a wireless communications system 100 may be configured to provide ultra-reliable communications for these functions.

In some implementations, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In other implementations, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some implementations, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (for example, synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission/reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based at least in part on listening according to different receive beam directions (for example, a beam direction determined to have a highest signal strength, highest signal-to-noise ratio, or otherwise acceptable signal quality based at least in part on listening according to multiple beam directions).

In some implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some implementations, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer (PHY), transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some implementations, a wireless device may support same-slot HARQ feedback, where the device may provide HARQ feedback in a specific slot for data received in a previous symbol in the slot. In other implementations, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol period may contain 2048 sampling periods. In some implementations, a subframe may be the smallest scheduling unit of the wireless communications system 100 and may be referred to as a transmission time interval (TTI). In other implementations, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)) and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (for example, set of subcarriers or RBs) within a carrier (for example, "in-band" deployment of a narrowband protocol type).

In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth or may be configurable to support communications over one of a set of carrier bandwidths. In some examples, the wireless communications system 100 may include base stations 105, UEs 115, or a combination thereof that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some implementations, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some implementations, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, or 80 MHz) at reduced symbol durations (for example, 16.67 microseconds). A TTI in eCC may consist of one or multiple symbol periods. In some implementations, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

To save battery power, a UE 115 may utilize a DRX cycle when communicating with a base station 105 that includes a periodic switching on and off of a receiver, for example in alternating active and inactive states. DRX cycles may be configured so that the UE 115 does not have to decode a physical downlink control channel (PDCCH) or receive physical downlink shared channel (PDSCH) transmissions in certain subframes. In some implementations, a UE 115 may monitor a communication link 125 continuously for an indication that the UE 115 may receive data. In other implementations (for example, to conserve power and extend battery life) the UE 115 may be configured with a DRX cycle.

The DRX cycle may consist of an on duration when the UE 115 may monitor for control information (for example, on a PDCCH) and a DRX period when the UE 115 may power down certain radio components. In some implementations, the UE 115 may be configured with a short DRX cycle and a long DRX cycle. For example, the UE 115 may enter a long DRX cycle if the UE is inactive for one or more short DRX cycles. The transition between the short DRX cycle, the long DRX cycle, and continuous reception may be controlled by an internal timer or by messaging from the base station 105. In some implementations, the UE 115 may receive scheduling messages on a PDCCH during the on duration(s). While monitoring the PDCCH for a scheduling message, the UE 115 may initiate a DRX inactivity timer. If a scheduling message is successfully received, the UE 115 may prepare to receive data, and the DRX inactivity timer may be reset. When the DRX inactivity timer expires without receiving a scheduling message, the UE 115 may move into a short DRX cycle and may start a DRX short cycle timer. When the DRX short cycle timer expires, the UE 115 may resume a long DRX cycle.

In some implementations, the DRX cycle may include a CDRX mode, where a UE 115 stays connected to a base station 105 during both on durations (for example, awake durations) and DRX periods (for example, sleep periods). The CDRX mode may allow the UE 115 to make signal-free transitions between sleep and awake states (for example, the DRX periods and on durations, respectively, or sleep and awake modes). The base station 105 may schedule transmissions during active times (for example, awake states or on durations). Additionally, the UE 115 may monitor a control channel, such as a PDCCH, during the active times (that is, wake up or be awake for monitoring the control channel). In some implementations, the active times may include when an on-duration timer is running, an inactive-timer is running, an SR is pending, or a combination thereof. The UE 115 may sleep to save battery power when not in an active time.

Additionally or alternatively, a UE 115 may enter an active time when uplink data is detected to be transmitted to a base station 105. During the active time, the UE 115 may perform an SR operation to request resources and configuration information for subsequently transmitting the uplink data. For example, the SR operation may include the UE transmitting an SR (for example, via an uplink control channel, such as a physical uplink control channel (PUCCH)) to the base station 105, the base station 105 transmitting an uplink grant (for example, via a downlink control channel, such as a PDCCH) to the UE 115, and the UE 115 transmitting the uplink data (for example, via a separate uplink channel, such as a physical uplink shared channel (PUSCH)) on resources as indicated in the uplink grant. Based on performing the SR operation in a single active time of the CDRX mode, the UE 115 may additionally save power.

Conventionally, a UE 115 may communicate with a single base station 105 for a CDRX mode via a single antenna subarray, thereby reducing any complexities with determining which base station 105 to transmit an SR when uplink data is detected. However, as described herein, a UE 115 may include multiple antenna subarrays for communicating with multiple TRPs concurrently, where each antenna subarray includes multiple antenna elements that may be used for beamforming communications, transmit diversity, receive diversity, or MIMO communications from the antenna subarray and the UE 115. In some implementations, the UE 115 may use separate antenna subarrays for the communications with the TRPs based on, for example, corresponding orientations of the antenna subarrays or physical locations of the antenna subarrays on the UE. For example, the UE 115 may communicate with a first base station 105 via a first antenna subarray, with a second base station 105 via a second antenna subarray, with a third base station 105 via a third antenna subarray, and so on.

Additionally or alternatively, the UE 115 may communicate with multiple TRPs, which may be separate base stations 105, separate antenna arrays within a base station 105, separate radio heads of a base station 105, or a combination thereof, where each TRP is associated with a corresponding antenna subarray (for example, resulting in a TRP-antenna subarray pair). As such, with multiple TRPs configured for communications (for example, the multiple TRPs may be considered a multi-TRP cluster), the UE 115 may be uncertain which TRP to transmit an SR to and which antenna subarray to use for transmitting the SR for initiating an SR operation, which TRP and antenna subarray are used for receiving the uplink grant, and which TRP and antenna subarray to use for transmitting the subsequent uplink data.

Wireless communications system 100 may support efficient techniques for determining which TRPs and antenna subarrays to use for an SR operation during a CDRX mode when multiple TRPs are configured for simultaneous communications with a UE 115. For example, a first TRP (that is, of the multiple TRPs with which the UE 115 is connected) may transmit configuration information about which antenna subarrays the UE 115 is to use when transmitting an SR (and to which TRPs), which of the TRPs to use for receiving an uplink grant (and on which antenna subarrays), and which antenna subarrays to use when transmitting the uplink data (and to which TRPs), or a combination thereof. Based on the configuration information, the UE 115 may perform the SR operation with the multiple TRPs using each corresponding antenna subarray located on the UE 115, with a single TRP using a corresponding antenna subarray (for example, the one antenna subarray may be selected dynamically or semi-statically), or with a subset of the TRPs using a corresponding subset of the antenna subarrays. Additionally or alternatively, the UE 115 may autonomously determine one or more TRP-antenna subarray pairs for transmitting the uplink data to and transmit an indication of the determined TRP-antenna subarray pair(s) with the SR. For example, the UE 115 may transmit this indication to a first TRP, receive an uplink grant from the first TRP (or from each of the TRPs indicated in the TRP-antenna subarray pairs), and transmit the uplink data to the determined TRPs of the TRP-antenna subarray pairs.

Figure 2:
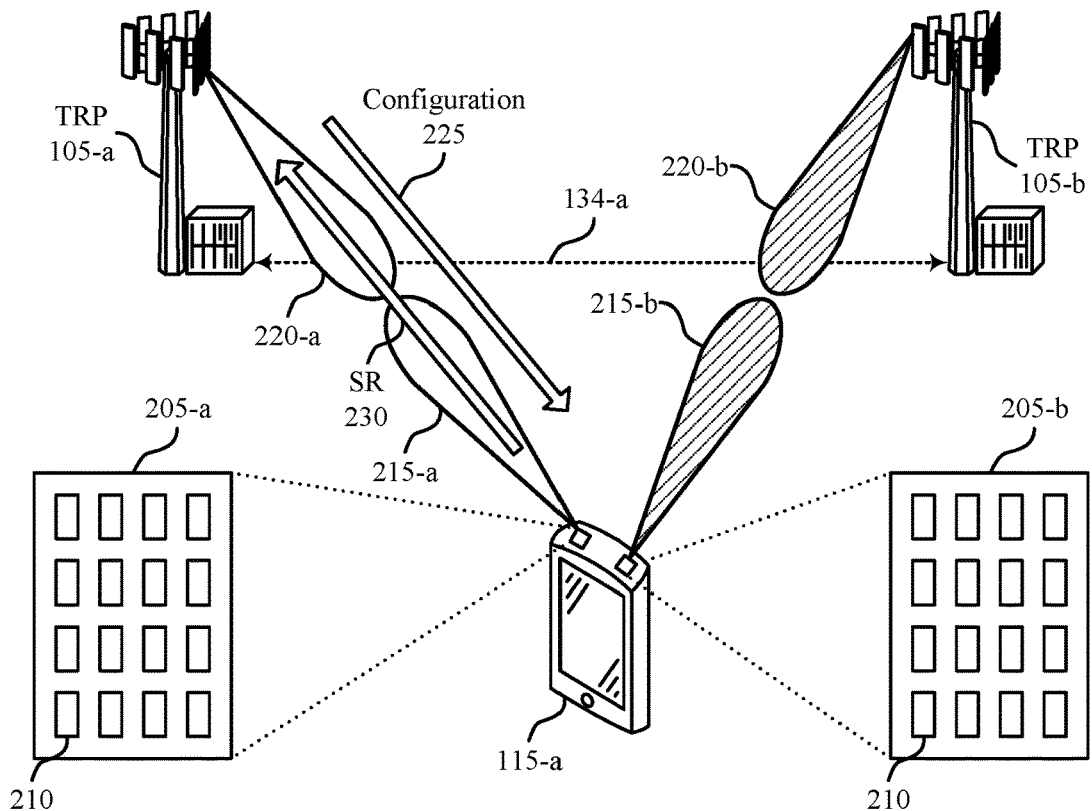
FIG. 2 illustrates an example of a wireless communications system that supports an SR operation in a connected DRX (CDRX) mode in accordance with aspects of the present disclosure.
Figure 2:
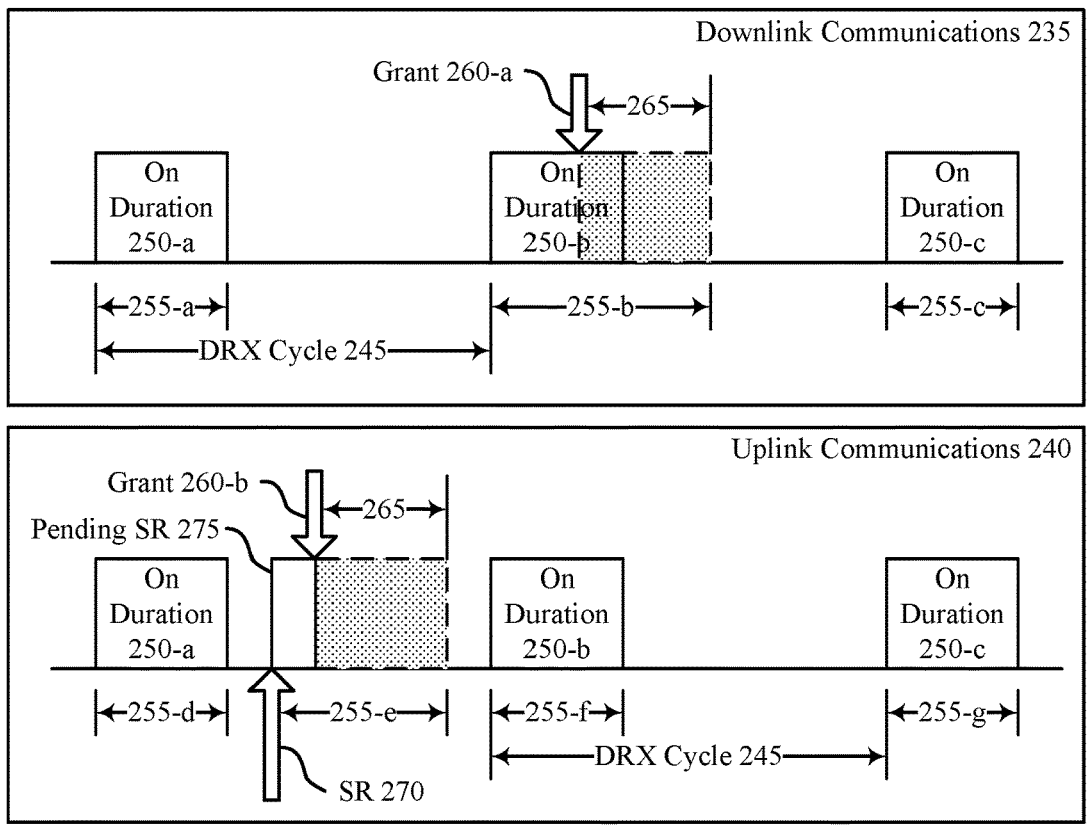

FIG. 2 illustrates an example of a wireless communications system 200 that supports SR operation in CDRX mode in accordance with aspects of the present disclosure. In some examples, wireless communications system 200 may implement aspects of wireless communications system 100. Wireless communications system 200 may include a TRP 105-a and a TRP 105-b, which may be examples of two base stations 105 as described above with reference to FIG. 1. In some implementations, each TRP 105 may be a separate antenna array of a base station 105, separate radio head of a base station 105, or a similar device used for accessing the network. Additionally, TRP 105-a and TRP 105-b may be connected by a backhaul link 134-a, enabling the two TRPs 105 to directly communicate with each other. In some implementations, TRP 105-a and TRP 105-b may be part of a multi-TRP cluster of multiple TRPs 105 with which a UE 115-a is configured to communicate (for example, by extension there may be more than the two TRPs 105 with which UE 115-a can communicate, and such TRPs 105 may be associated with one, two, or more base stations). Wireless communications system 200 may also include UE 115-a, which may be an example of a corresponding UE 115 as described above with reference to FIG. 1.

As described herein, UE 115-a may include multiple antenna subarrays 205 for communicating with each TRP 105 concurrently, where each antenna subarray 205 includes multiple antenna elements 210. For example, UE 115-a may communicate with TRP 105-a via antenna subarray 205-a and with TRP 105-b via antenna subarray 205-b, where TRP 105-a and antenna subarray 205-a may constitute a first TRP-antenna subarray pair and TRP 105-b and antenna subarray 205-b may constitute a second TRP-antenna subarray pair. Additionally, UE 115-a may use the antenna elements 210 of each antenna subarray 205 for steering and forming respective beams 215 for the communications with each TRP 105, where beam 215-a is used for communications with TRP 105-*a* and beam 215-*b* is used for communications with TRP 105-*b*. Each TRP 105 may also use corresponding beams 220 for their respective communications with UE 115-*a*, where TRP 105-*a* may use a beam 220-*a* for communicating with UE 115-*a* and TRP 105-*b* may use a beam 220-*b* for communicating with UE 115-*a*. In some implementations, each beam 215 and 220 may be used for both transmitting and receiving information for UE 115-*a* and TRPs 105-*a* and 105-*b*, respectively. Additionally or alternatively, a first beam may be used for transmitting information or data, and a second, separate beam may be used for receiving information at each wireless device (for example, UE 115-*a* or TRP 105-*a* or TRP 105-*b*).

In some implementations, UE 115-*a* may communicate with both TRPs 105 according to a CDRX mode, where UE 115-*a* monitors for downlink communications from either or both TRPs 105 during awake states of the CDRX mode. However, uplink communications from UE 115-*a* for the CDRX mode may include uncertainties about which antenna subarray 205 to use for performing an SR operation or with which TRP 105 to perform the SR operation when UE 115-*a* includes the multiple antenna subarrays 205 for communicating with the multiple TRPs 105. The SR operation may include UE 115-*a* transmitting an SR 230 via an uplink channel (for example, a PUCCH) to one or more TRPs 105, the one or more TRPs 105 transmitting an uplink grant via a downlink channel (for example, a PDCCH) to UE 115-*a*, and UE 115-*a* transmitting the uplink data via a separate uplink channel (for example, a PUSCH) on resources as indicated in the uplink grant.

In some implementations, to mitigate the uncertainty, TRP 105-*a* (or a separate TRP 105 that operates as an anchor TRP) may transmit a configuration 225 to inform UE 115-*a* of which TRP(s) 105 or antenna subarray(s) 205 are to be used to transmit SR 230, the corresponding PDCCH, and the corresponding PUSCH. Based on configuration 225, UE 115-*a* may transmit SR 230 using each antenna subarray 205 (that is, each antenna subarray 205 located on UE 115-*a*) to respective TRPs 105 (for example, to TRP 105-*a* on antenna subarray 205-*a* and to TRP 105-*b* on antenna subarray 205-*b*), on one antenna subarray 205 to a corresponding TRP 105 (for example, to TRP 105-*a* on antenna subarray 205-*a*), or a subset of the multiple antenna subarrays 205 of UE 115-*a* to the corresponding TRPs 105. The respective TRPs 105, corresponding TRP 105, or subset of TRPs 105 may then transmit an uplink grant to UE 115-*a* based on receiving SR 230. Additionally, UE 115-*a* may then transmit the uplink data using the antenna subarrays 205 used for transmitting SR 230 and using the antenna subarrays 205 used for receiving the uplink grant.

In other implementations, to mitigate the uncertainty, UE 115-*a* may autonomously determine which TRP-antenna subarray pairs are suitable for the SR operation (for example, the TRPs 105 suitable for transmitting the uplink grant on a PDCCH and the antenna subarrays 205 suitable for transmitting the uplink data on a PUSCH) and transmit this determination in SR 230. In some implementations, UE 115-*a* may determine the TRP-antenna subarray pairs based on measured channel qualities for each TRP 105. For example, UE 115-*a* may use a first TRP-antenna subarray link (that is, the first TRP-antenna subarray pair between antenna subarray 205-*a* and TRP 105-*a*) for transmission of SR 230, for transmission of the uplink grant (for example, on the PDCCH), or for both transmissions of SR 230 and the uplink grant, which supports power saving purposes at UE 115-*a*. Antenna subarray 205-*a* may be an anchor antenna subarray (for example, a master antenna subarray) of UE 115-*a*. In some implementations, during off-duration cycles of the CDRX mode (such as, DRX periods and sleep periods), UE 115-*a* may have more information about the channel than either TRP 105, which may improve the chances of the SR operation based on the more accurate information.

After receiving the uplink grant from the first TRP-antenna subarray link (for example, from TRP 105-*a*), UE 115-*a* may transmit uplink data to any TRP 105 determined with the suitable TRP-antenna subarray pairs. Additionally or alternatively, TRP 105-*a* may share information about the suitable TRP-antenna subarray pairs with TRP 105-*b* (or other TRPs 105) via backhaul link 134-*a*, and TRP 105-*b* (or the other TRPs 105) may also transmit an uplink grant to UE 115-*a*. In some implementations, the information shared across backhaul link 134-*a* may include scheduling information about the incoming uplink data. For example, the scheduling information may further include information about beam 220-*b* at TRP 105-*b* for receiving the uplink data from UE 115-*a*.

As described above, the communications between UE 115-*a* and TRPs 105-*a* and 105-*b* may occur according to a CDRX mode, which may include downlink communications 235 and uplink communications 240. Additionally, each of downlink communications 235 and uplink communications 240 may include one or more DRX cycles 245 of an on-duration 250 and then a sleep period (for example, inactive period, DRX period, off-duration, or sleep state) for the rest of the DRX cycle 245 not occupied by an active time 255. For example, the active time 255 may occur during the on-duration 250 (such as, active time 255-*a* corresponds to on-duration 250-*a*, active time 255-*c* corresponds to on-duration 250-*c*, and so on) or may occur for a longer time than the on-duration 250 (such as, active time 255-*b* is longer than on-duration 250-*b*). In downlink communications 235, UE 115-*a* may receive a grant 260-*a* (for example, on a PDCCH for a downlink grant to receive subsequent downlink information), where receiving grant 260-*a* initiates an inactivity timer 265. UE 115-*a* may remain awake until the inactivity timer 265 expires (for example, extending active time 255-*b* past the end of on-duration 250-*b*) and then may revert to a sleep state once the inactivity timer 265 expires.

Similarly, in uplink communications 240, the active times 255 may correspond to the on-durations 250 of the CDRX mode (for example, active times 255-*d*, 255-*f*, and 255-*g* may last for the same span of time as on-durations 250-*a*, 250-*b*, and 250-*c*, respectively). The on-durations 250 in uplink communications 240 may correspond to the on-durations 250 of downlink communications 235 (that is, the on-durations 250 of the CDRX mode are configured for either uplink or downlink communications). However, in uplink communications 240, if UE 115-*a* detects uplink data to be transmitted to a TRP 105, UE 115-*a* may wake up and transmit an SR 270 (for example, SR 230), which may begin an active time 255-*e* outside of the on-durations 250. Active time 255-*e* may include a period for a pending SR 275, where UE 115-*a* is awaiting a grant 260-*b* (for example, an uplink grant based on SR 270) from a TRP 105. After receiving grant 260-*b* (for example, a PDCCH carrying the uplink grant), UE 115-*a* may begin the inactivity timer 265 and revert to a sleep state once the inactivity timer expires if no further signaling is received from a TRP 105.

As described herein, UE 115-*a* may perform the SR operation with one or multiple TRPs 105 during an active time 255 of uplink communications 240 based on configuration 225 or based on indicating suitable TRP-antenna subarray pairs in SR 230 (for example, SR 270). For example, UE 115-a may transmit SR 230 to the indicated TRP(s) 105 (for example, from configuration 225) or to TRP 105-a (for example, when autonomously determining the TRP-antenna subarray pairs), receive an uplink grant (for example, grant 260-b) from one or more of the TRPs 105, and subsequently transmit uplink data to the one or more TRPs 105.

Figure 3:
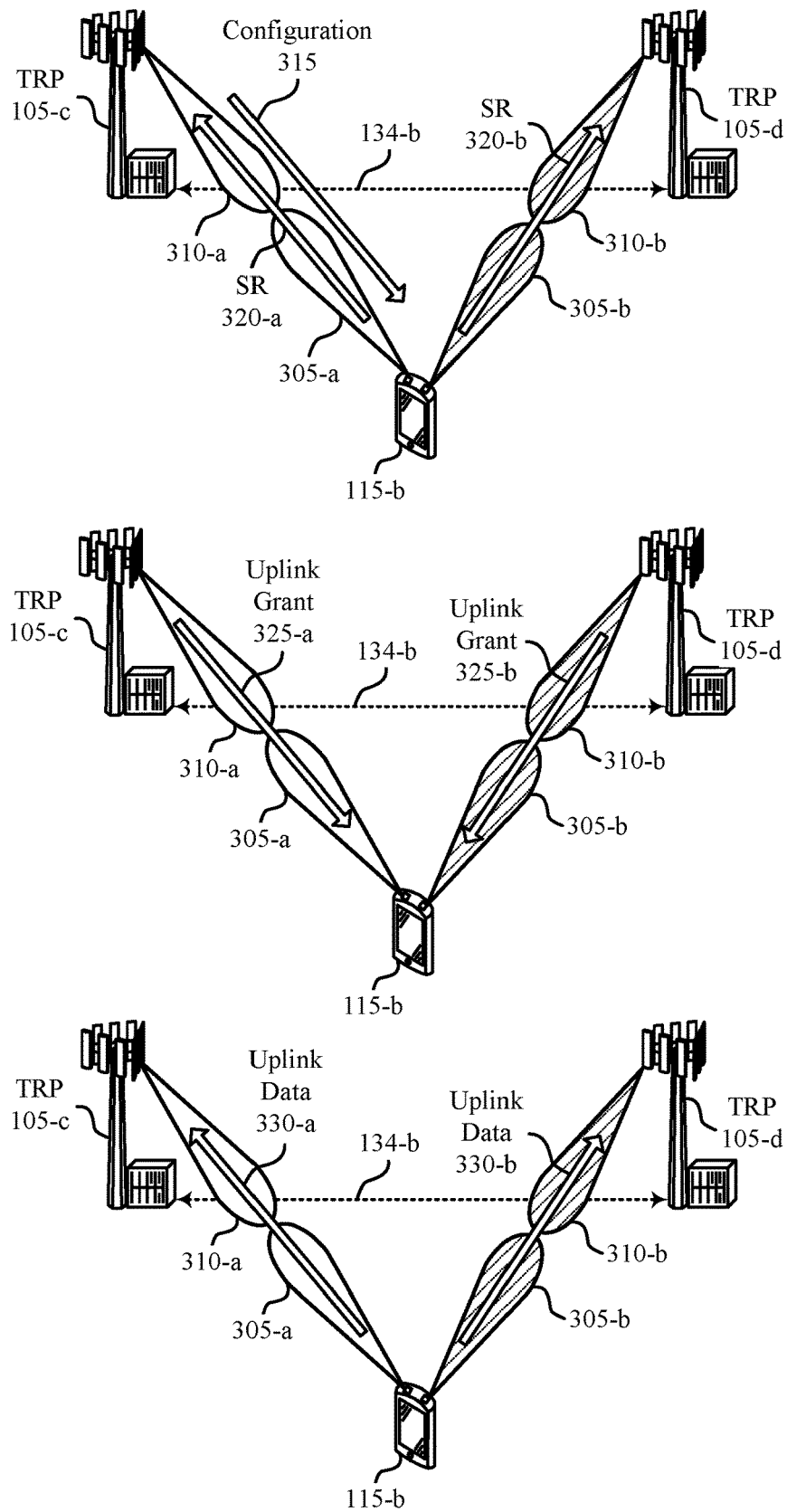
FIGS. 3, 4, and 5 illustrate examples of SR operations in a CDRX mode in accordance with aspects of the present disclosure.

FIG. 3 illustrates an example of an SR operation 300 in a CDRX mode in accordance with aspects of the present disclosure. In some examples, SR operation 300 may implement aspects of wireless communications systems 100 and 200. SR operation 300 may include a TRP 105-c and a TRP 105-d, which may be examples of TRPs 105 or base stations 105 as described above with reference to FIGS. 1 and 2. Additionally, TRP 105-c and TRP 105-d may be connected by a backhaul link 134-b, enabling the two TRPs 105 to directly communicate with each other. In some implementations, TRP 105-c and TRP 105-d may be part of a multi-TRP cluster of multiple TRPs 105 that a UE 115-b is configured to communicate with (for example, there may be more than the two TRPs 105 that UE 115-b can communicate with). SR operation 300 may also include UE 115-b, which may be an example of a corresponding UE 115 as described above with reference to FIGS. 1 and 2.

As described herein, UE 115-b may include multiple antenna subarrays for communicating with each TRP 105 concurrently, where each antenna subarray includes multiple antenna elements. For example, UE 115-b may communicate with TRP 105-c via a first antenna subarray and with TRP 105-d via a second antenna subarray, where TRP 105-c and the first antenna subarray may constitute a first TRP-antenna subarray pair and TRP 105-d and the second antenna subarray may constitute a second TRP-antenna subarray pair. Additionally, UE 115-b may use the antenna elements of each antenna subarray for steering and forming respective beams 305 for the communications with each TRP 105, where beam 305-a is used for communications with TRP 105-c and beam 305-b is used for communications with TRP 105-d. Each TRP 105 may also use corresponding beams 310 for their respective communications with UE 115-b, where TRP 105-c may use a beam 310-a for communicating with UE 115-b and TRP 105-d may use a beam 310-b for communicating with UE 115-b. In some implementations, each beam 305 and 310 may be used for both transmitting and receiving information for UE 115-b and TRPs 105-c and 105-d, respectively. Additionally or alternatively, a first beam may be used for transmitting information or data, and a second, separate beam may be used for receiving information at each wireless device (for example, UE 115-b or TRP 105-c or TRP 105-d).

In some implementations, TRP 105-c (for example, an anchor TRP) may transmit a configuration 315 to UE 115-b that informs UE 115-b which TRPs 105 or antenna subarrays to use for transmitting an SR 320, corresponding PDCCHs for receiving an uplink grant 325, and corresponding PUSCHs for transmitting uplink data 330. As shown, configuration 315 may indicate for all subarrays of UE 115-b to transmit an SR 320 on a PUCCH (for example, an uplink channel) simultaneously. Each associated TRP 105 (for example, as part of respective TRP-antenna subarray pairs) may need to monitor for a respective PUCCH from UE 115-b. For example, UE 115-b may transmit an SR 320-a to TRP 105-c and an SR 320-b to TRP 105-d. Subsequently, each TRP 105 (for example, in the multi-TRP cluster) may then transmit a separate PDCCH for the uplink grant 325. For example, TRP 105-c may transmit an uplink grant 325-a to UE 115-b, and TRP 105-d may transmit a separate uplink grant 325-b to UE 115-b. In some implementations, even though UE 115-b transmits an SR 320 on each antenna subarray, not every corresponding TRP 105 may receive an SR 320, and the TRPs 105 that do not receive an SR 320 may not transmit a corresponding uplink grant 325, while the TRPs 105 that do receive an SR 320 do transmit a corresponding uplink grant 325.

UE 115-b may use all antenna subarrays associated with each of the TRPs 105 (for example, in the multi-TRP cluster) for transmitting uplink data 330 via separate PUSCHs. For example, UE 115-b may transmit uplink data 330-a to TRP 105-c and may transmit uplink data 330-b to TRP 105-d. Performing the SR operation using all antenna subarrays of UE 115-b and all TRPs 105 of a multi-TRP cluster may improve the reliability of receiving an uplink grant 325 for transmitting subsequent uplink data 330. However, using all antenna subarrays may increase power consumption at UE 115-b, reducing battery power and battery life.

Figure 4:
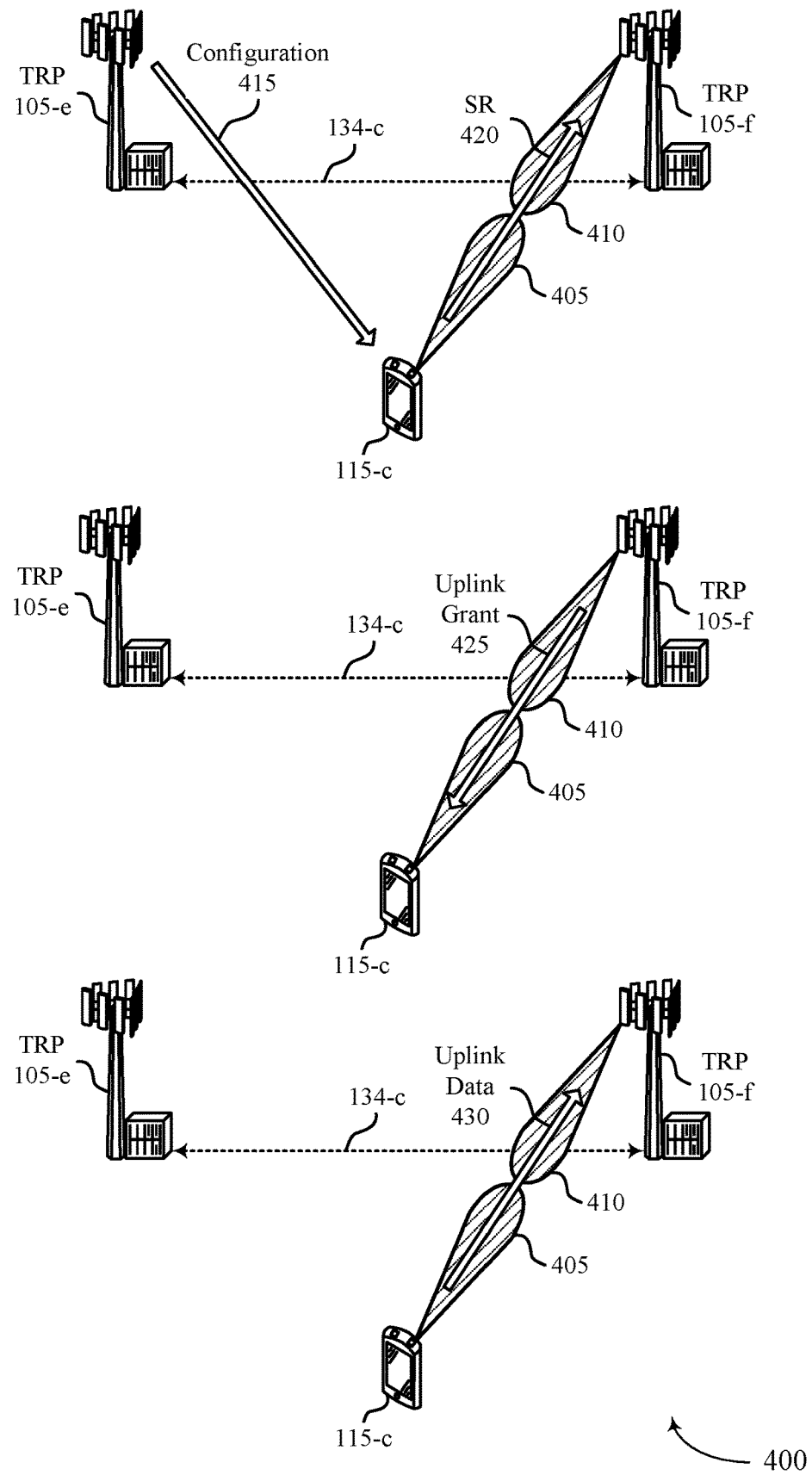

FIG. 4 illustrates an example of an SR operation 400 in a CDRX mode in accordance with aspects of the present disclosure. In some examples, SR operation 400 may implement aspects of wireless communications systems 100 and 200. SR operation 400 may include a TRP 105-e and a TRP 105-f, which may be examples TRPs 105 or base stations 105 as described above with reference to FIGS. 1-3. Additionally, TRP 105-e and TRP 105-f may be connected by a backhaul link 134-c, enabling the two TRPs 105 to directly communicate with each other. In some implementations, TRP 105-e and TRP 105-f may be part of a multi-TRP cluster of multiple TRPs 105 that a UE 115-c is configured to communicate with (for example, there may be more than the two TRPs 105 with which UE 115-c can communicate, and the more than two TRPs 105 may be associated with one, two, or more base stations). SR operation 400 may also include UE 115-c, which may be an example of a corresponding UE 115 as described above with reference to FIGS. 1-3.

As described herein, UE 115-c may include multiple antenna subarrays for communicating with each TRP 105 concurrently, where each antenna subarray includes multiple antenna elements. For example, UE 115-c may communicate with TRP 105-e via a first antenna subarray and with TRP 105-f via a second antenna subarray, where TRP 105-e and the first antenna subarray may constitute a first TRP-antenna subarray pair and TRP 105-f and the second antenna subarray may constitute a second TRP-antenna subarray pair. Additionally, UE 115-c may use the antenna elements of each antenna subarray for steering and forming respective beams 405 for the communications with each TRP 105, where beam 405 is used for communications with TRP 105-f. Each TRP 105 may also use corresponding beams 410 for their respective communications with UE 115-c, where TRP 105-f may use beam 410 for communicating with UE 115-c. In some implementations, each beam 405 and 410 may be used for both transmitting and receiving information for UE 115-c and TRPs 105-e and 105-f, respectively. Additionally or alternatively, a first beam may be used for transmitting information or data, and a second, separate beam may be used for receiving information at each wireless device (for example, UE 115-c or TRP 105-e or TRP 105-f).

In some implementations, TRP 105-e (for example, an anchor TRP) may transmit a configuration 415 to UE 115-c that informs UE 115-c which TRPs 105 or antenna subarrays to use for transmitting an SR 420, corresponding PDCCHs for receiving an uplink grant 425, and corresponding PUSCHs for transmitting uplink data 430. As shown, one antenna subarray (or a subset of antenna subarrays) of UE 115-*c* may transmit SR 420 on a PUCCH to TRP 105-*f*. In some implementations, TRP 105-*e* may select the one antenna subarray semi-statically and indicate the selected antenna subarray in configuration 415. For example, TRP 105-*e* may indicate the selected antenna subarray via RRC signaling, a MAC-CE, a DCI message, or a combination thereof. In some implementations, TRP 105-*e* may select the antenna subarray based on information from UE 115-*c* previously received or indicated. The selected antenna subarray may be an anchor antenna subarray (for example, master antenna subarray) of UE 115-*c*. Based on the anchor antenna subarray, any predefined TRP(s) 105 associated with the anchor antenna subarray(s) need to monitor for the PDCCH carrying SR 420.

Additionally or alternatively, UE 115-*c* may select the one antenna subarray (or subset of antenna subarrays) dynamically without an indication from TRP 105-*e* (for example, without the configuration 415). UE 115-*c* may indicate this selected antenna subarray(s) to the associated TRPs 105 in the PUCCH carrying SR 420, where the associated TRP(s) 105 need to monitor for the PUCCH(s). In some implementations, however, UE 115-*c* may not indicate the selected antenna subarray(s) because all TRPs 105 (that is, including the associated TRPs) that UE 115-*c* is configured to communicate with (for example, the multi-TRP cluster) may need to monitor for SR 420, which may eliminate the need for signaling the indication if the TRPs 105 are already monitoring for SR 420. By using one antenna subarray (or a subset of antenna subarrays), UE 115-*c* may conserve power rather than transmitting SR 420 using every antenna subarray.

Based on transmitting SR 420 to the one selected TRP 105 (or subset of TRPs 105), the TRPs 105 that detect SR 420 on a PUCCH may subsequently transmit a PDCCH for uplink grant 425. For example, TRP 105-*f* may receive SR 420 and then transmit uplink grant 425 to UE 115-*c* based on receiving SR 420. Additionally or alternatively, even though UE 115-*c* transmits SR 420 using one antenna subarray (or a subset of antenna subarrays), each TRP 105 of the TRP multi-cluster (or a greater number of TRPs 105 from the TRP multi-cluster than UE 115-*c* transmitted SR 420 to) may transmit an uplink grant 425 to UE 115-*c*. In some implementations, the TRPs 105 that transmit an uplink grant 425 without receiving an SR 420 may determine to transmit the uplink grant 425 based on information communicated through backhaul link 134-*c* from the TRP(s) 105 that did receive an SR 420. UE 115-*c* may then use any antenna subarray associated with the TRPs 105 that sent the PDCCH for transmitting uplink data 430 via a PUSCH. For example, based on receiving uplink grant 425 from TRP 105-*f*, UE 115-*c* may use the corresponding antenna subarray to transmit uplink data 430 to TRP 105-*f*.

Figure 5:
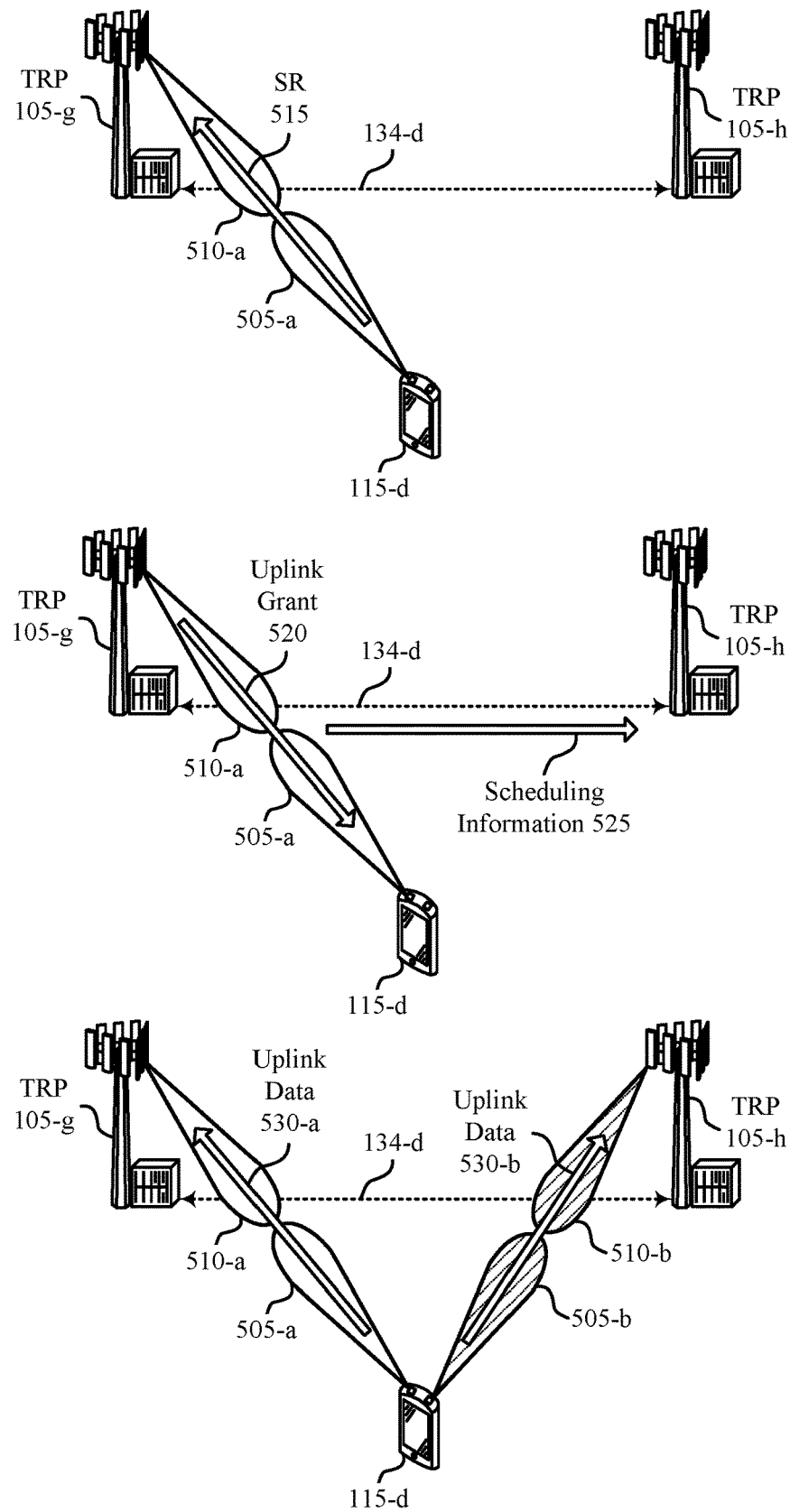

FIG. 5 illustrates an example of an SR operation 500 in a CDRX mode in accordance with aspects of the present disclosure. In some examples, SR operation 500 may implement aspects of wireless communications systems 100 and 200. SR operation 500 may include a TRP 105-*g* and a TRP 105-*h*, which may be examples TRPs 105 or base stations 105 as described above with reference to FIGS. 1-4. Additionally, TRP 105-*g* and TRP 105-*h* may be connected by a backhaul link 134-*d*, enabling the two TRPs 105 to directly communicate with each other. In some implementations, TRP 105-*g* and TRP 105-*h* may be part of a multi-TRP cluster of multiple TRPs 105 that a UE 115-*d* is configured to communicate with (for example, there may be more than the two TRPs 105 that UE 115-*d* can communicate with). SR operation 500 may also include UE 115-*d*, which may be an example of a corresponding UE 115 as described above with reference to FIGS. 1-4.

As described herein, UE 115-*d* may include multiple antenna subarrays for communicating with each TRP 105 concurrently, where each antenna subarray includes multiple antenna elements. For example, UE 115-*d* may communicate with TRP 105-*g* via a first antenna subarray and with TRP 105-*h* via a second antenna subarray, where TRP 105-*g* and the first antenna subarray may constitute a first TRP-antenna subarray pair and TRP 105-*h* and the second antenna subarray may constitute a second TRP-antenna subarray pair. Additionally, UE 115-*d* may use the antenna elements of each antenna subarray for steering and forming respective beams 505 for the communications with each TRP 105, where beam 505-*a* is used for communications with TRP 105-*g* and beam 505-*b* is used for communications with TRP 105-*h*. Each TRP 105 may also use corresponding beams 510 for their respective communications with UE 115-*d*, where TRP 105-*g* may use a beam 510-*a* for communicating with UE 115-*d* and TRP 105-*h* may use a beam 510-*b* for communicating with UE 115-*d*. In some implementations, each beam 505 and 510 may be used for both transmitting and receiving information for UE 115-*d* and TRPs 105-*g* and 105-*h*, respectively. Additionally or alternatively, a first beam may be used for transmitting information or data, and a second, separate beam may be used for receiving information at each wireless device (for example, UE 115-*d* or TRP 105-*g* or TRP 105-*h*).

In some implementations, UE 115-*d* may use one TRP-antenna subarray link (that is, a first TRP-antenna subarray pair, where the first TRP-antenna subarray pair includes an anchor TRP) for an SR 515 transmission, a PDCCH transmission carrying an uplink grant 520, or a combination thereof based on an autonomous selection by UE 115-*d*. Additionally or alternatively, UE 115-*d* may use more than one TRP-antenna subarray links for the SR 515 transmission and uplink grant 520 transmission/reception. In some implementations, UE 115-*d* may determine the one or more TRP-antenna subarray links based on channel qualities of each TRP in the multi-TRP cluster. UE 115-*d* may transmit information about the TRP-antenna subarray link(s) suitable (for example, preferred) for PDCCH and PUSCH transmissions when transmitting SR 515. That is, SR 515 may include information about which TRP-subarray pair(s) are suitable for an SR operation (for example, PDCCH transmission of uplink grant 520 and PUSCH(s) transmissions of uplink data 530). In some implementations, UE 115-*d* may indicate one or more TRPs 105 for the subsequent SR operation transmissions in the transmission of SR 515. This indication may be included in SR 515 through extra bits within SR 515. During off-durations while operating in a CDRX mode, UE 115-*d* may have more information about a channel being used for communications between UE 115-*d* and the TRPs 105, which may increase the accuracy of which TRP-antenna subarray pair(s) are selected for the subsequent SR operation transmissions after transmitting SR 515.

One or more TRPs 105 may then transmit a PDCCH for uplink grant 520. For example, TRP 105-*g* may transmit uplink grant 520 based on information received with SR 515 from UE 115-*d* and being part of the TRP-antenna subarray pair used for the transmission of SR 515. Additionally or alternatively, multiple TRPs 105 (for example, TRP 105-*g* and TRP 105-*h*) may transmit uplink grants 520 based on information received with SR 515. For example, TRP 105-*g* may transmit scheduling information 525 to TRP 105-*h* via backhaul link 134-d, where scheduling information 525 includes information about the selected TRP-antenna subarray pair(s) as indicated in SR 515. Additionally, scheduling information 525 may include information about uplink receive beams that the other TRPs 105 can use for receiving uplink data 530 from UE 115-d. In some implementations, uplink grant 520 may include DCI messages or a MAC CE that indicate configuration information about the other TRPs 105 to use transmissions of uplink data 530 (for example, that TRP 105-g identifies based on the selected TRP-antenna subarray pair(s) information in SR 515). Subsequently, UE 115-d may then transmit uplink data 530 via PUSCHs to the TRPs 105 from the selected TRP-antenna subarray pair(s). For example, UE 115-d may transmit uplink data 530-a to TRP 105-g and uplink data 530-b to TRP 105-h. In some implementations, either a dynamic TRP selection or simultaneous transmissions to the TRPs 105 may be possible for the uplink data 530 transmissions.

Additionally, in some implementations, a configuration message (for example, similar to configuration 315 or 415 as described above with reference to FIGS. 3 and 4, respectively) may be transmitted by a TRP 105 (for example, TRP 105-g or an anchor TRP 105) to UE 115-d. The configuration message may inform UE 115-d of how to transmit SR 515 (for example, to all associated TRPs 105 using corresponding antenna subarrays, to at least one TRP 105 using dynamically selected antenna subarray(s), or to at least one TRP 105 using semi-statically selected antenna subarray(s)). In these implementations, UE 115-d may still select the suitable TRP-antenna subarray pairs for transmitting SR 515 and for performing the rest of the SR operation but may use the configuration message for determining other configuration information for transmitting SR 515 and the rest of the SR operation (for example, information on the channels, such as a PDCCH and PUSCH, used for receiving and transmitting the different messages of the SR operation).

Figure 6:
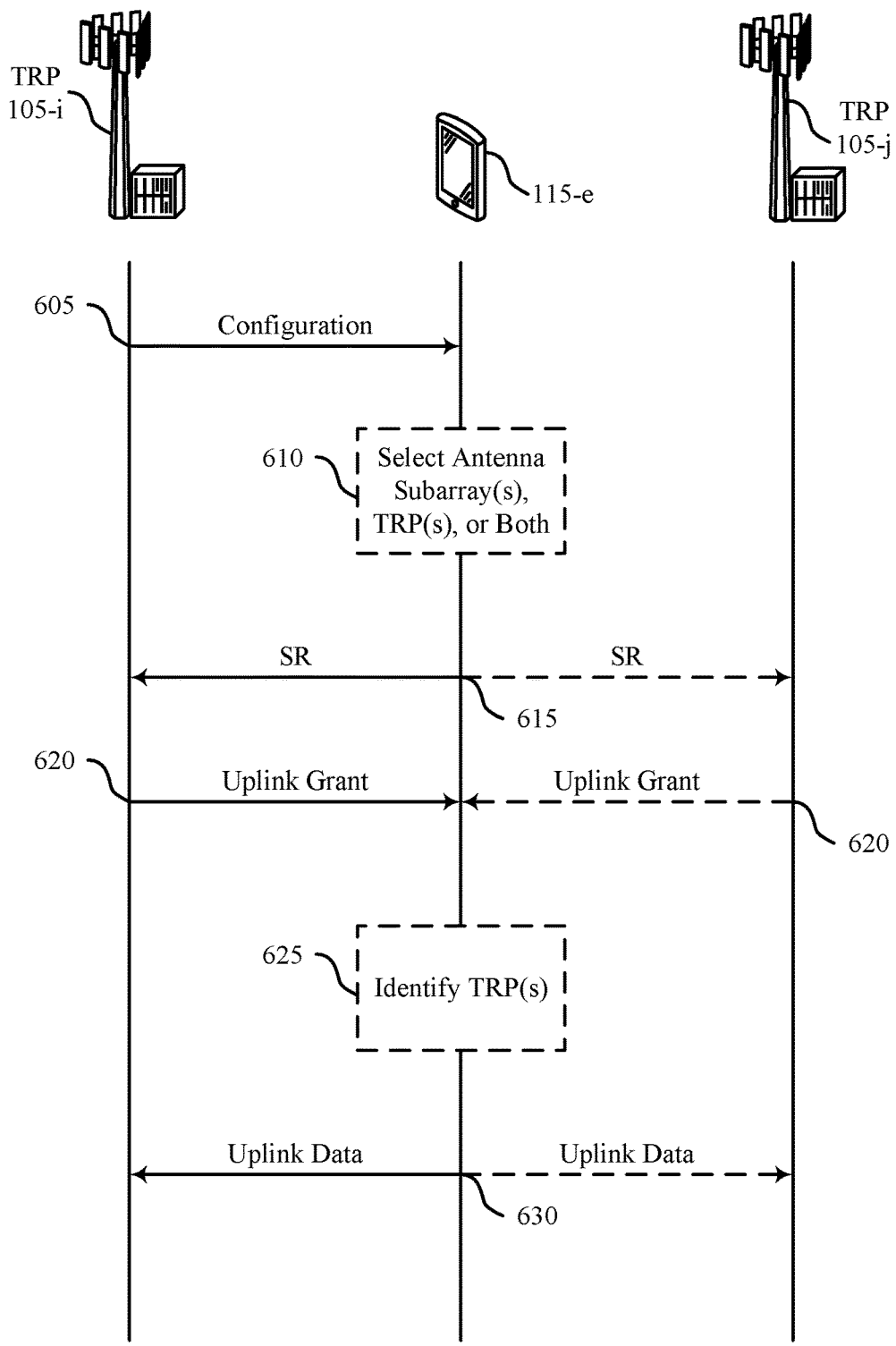
FIGS. 6 and 7 illustrate examples of process flows that support an SR operation in a CDRX mode in accordance with aspects of the present disclosure.

FIG. 6 illustrates an example of a process flow 600 that supports an SR operation in a CDRX mode in accordance with aspects of the present disclosure. In some examples, process flow 600 may implement aspects of wireless communications systems 100 and 200. Process flow 600 may include a TRP 105-i and a TRP 105-j, which may be examples of two TRPs 105 or base stations 105 as described above with reference to FIGS. 1-5. In some implementations, each TRP 105 may be a separate antenna array of a base station 105, separate radio head of a base station 105, or a similar device used for accessing the network. In some implementations, TRP 105-a and TRP 105-b may be part of a multi-TRP cluster of multiple TRPs 105 that a UE 115-e is configured to communicate with (for example, there may be more than the two TRPs 105 that UE 115-e can communicate with). Process flow 600 may also include UE 115-e, which may be an example of a corresponding UE 115 as described above with reference to FIG. 1-5.

In the following description of the process flow 600, the operations between UE 115-e, TRP 105-i, and TRP 105-j may be performed in different orders or at different times. Certain operations may also be left out of the process flow 600, or other operations may be added to the process flow 600. While UE 115-e, TRP 105-i, and TRP 105-j are shown performing the operations of process flow 600, any wireless device may perform the operations shown.

At 605, UE 115-e may receive a configuration (for example, from TRP 105-i) indicating a set of antenna subarrays (for example, antenna panels) of itself, or a set of TRPs, or a combination thereof, for UE 115-e to use to communicate (for example, perform an SR operation) while operating in a DRX mode (for example, a CDRX mode). In some implementations, UE 115-e may receive the configuration in RRC signaling, or a DCI message, or a MAC-CE, or a combination thereof. Additionally, TRP 105-i may identify an anchor TRP (for example, itself, or another TRP, such as TRP 105-j) of the set of TRPs, where the anchor TRP monitors for SRs from UE 115-e.

At 610, UE 115-e may select at least one antenna subarray of a set of antenna subarrays of itself to use transmit an SR, or receive an uplink grant, or transmit uplink data, or a combination thereof (for example, for the SR operation).

At 615, UE 115-e may transmit, based on the received configuration, an SR while operating in the DRX mode. In some implementations, UE 115-e may transmit the SR to multiple TRPs using multiple antenna subarrays of itself, where the set of TRPs for UE 115-e to communicate with include the multiple TRPs, and the set of antenna subarrays of UE 115-e include the multiple antenna subarrays. Additionally or alternatively, UE 115-e may transmit the SR using the set of antenna subarrays indicated by the received configuration or the set of antenna subarrays including a subset of multiple antenna subarrays of UE 115-e. In some implementations, UE 115-e may transmit the SR to a first TRP of the set of TRPs (for example, TRP 105-i), to a second TRP of the set of TRPs (for example, TRP 105-j), and to additional TRPs of the set of TRPs. Additionally, UE 115-e may transmit the SR on an uplink control channel (for example, a PUCCH). In some implementations, UE 115-e may transmit the SR to the anchor TRP identified in 605.

At 620, UE 115-e may receive an uplink grant in response to the transmitted SR. In some implementations, UE 115-e may receive, from a first TRP of the set of TRPs (for example, TRP 105-i), the uplink grant for the first TRP in response to the transmitted SR and may receive, from a second TRP of the set of TRPs, an uplink grant for the second TRP in response to the transmitted SR. Additionally or alternatively, the set of TRPs may include multiple TRPs (for example, a multi-TRP cluster), and UE 115-e may receive, from each TRP of the multiple TRPs, an uplink grant for each TRP in response to the transmitted SR. In some implementations, UE 115-e may transmit the SR to a first TRP (for example, TRP 105-i) of the set of TRPs and may receive the uplink grant from the first TRP in response to the transmitted SR. Additionally, UE 115-e may receive the uplink grant on a downlink control channel (for example, a PDCCH). In some implementations, a TRP may determine to refrain from transmitting an uplink grant (for example, via a second TRP of the set of TRPs) based on determining that the TRP failed to receive a second SR (for example, via the second TRP).

At 625, UE 115-e may identify one or more TRPs of the set of TRPs as having transmitted an uplink grant in response to the transmitted SR.

At 630, UE 115-e may transmit uplink data based on the received uplink grant and the received configuration. In some implementations, the set of TRPs may include multiple TRPs, and UE 115-e may transmit uplink data to each of the multiple TRPs. Additionally or alternatively, UE 115-e may transmit the uplink data to the one or more TRPs identified at 625. In some implementations, UE 115-e may transmit the uplink data on an uplink shared channel (for example, a PUSCH). Following the transmission of the uplink data, UE 115-e may return to an off state (a sleep state) of the DRX cycle, until a next on duration or until UE 115-e identifies uplink data to be sent and transmits another SR.

Figure 7:
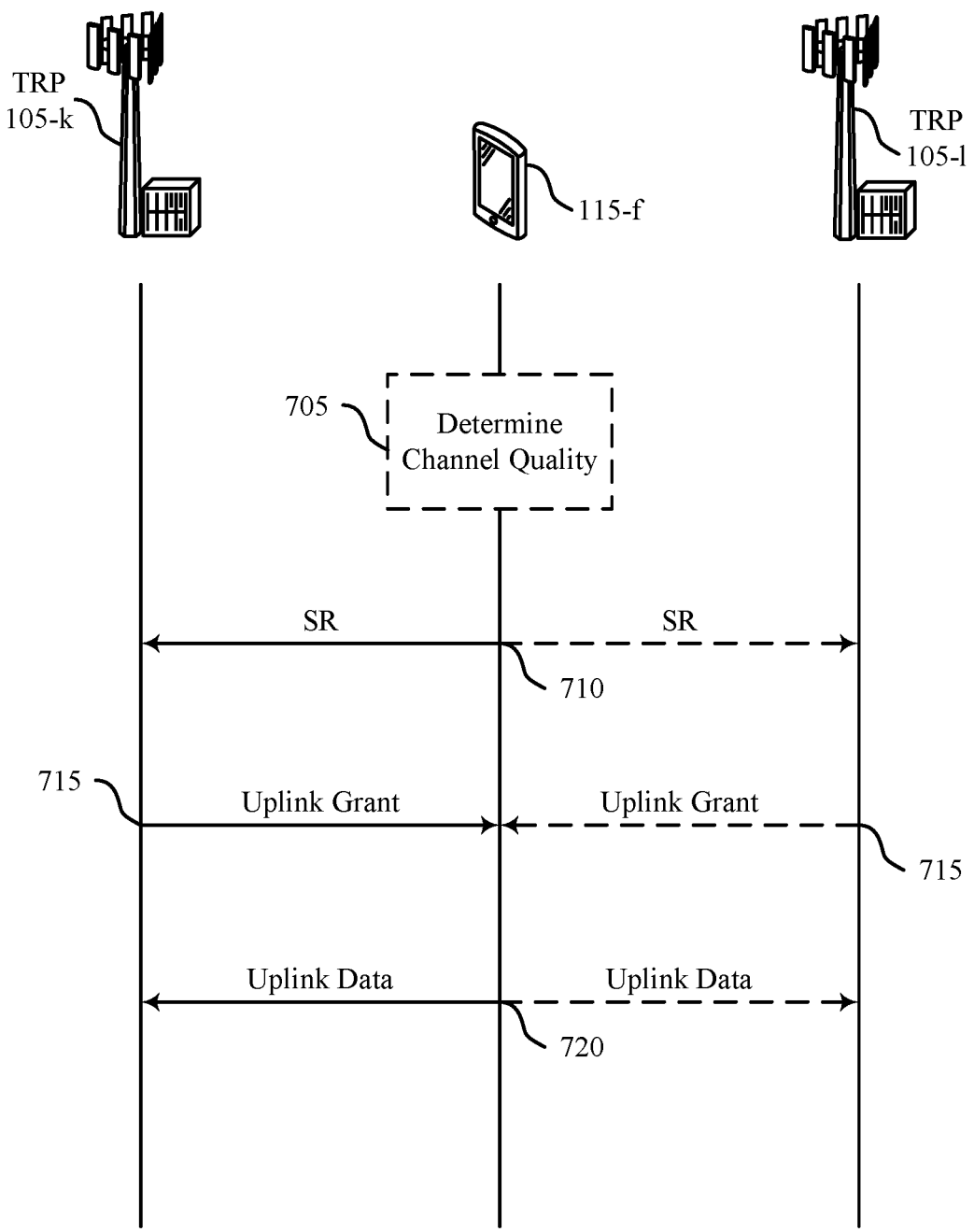

FIG. 7 illustrates an example of a process flow 700 that supports an SR operation in a CDRX mode in accordance with aspects of the present disclosure. In some examples, process flow 700 may implement aspects of wireless communications system 100 and 200. Process flow 700 may include a TRP 105-*k* and a TRP 105-*l*, which may be examples of two TRPs 105 or base stations 105 as described above with reference to FIGS. 1-6. In some implementations, each TRP 105 may be a separate antenna array of a base station 105, separate radio head of a base station 105, or a similar device used for accessing the network. In some implementations, TRP 105-*k* and TRP 105-*l* may be part of a multi-TRP cluster of multiple TRPs 105 with which UE 115-*f* is configured to communicate (for example, there may be more than the two TRPs 105 with which UE 115-*f* can communicate, and the more than two TRPs 105 may be associated with one, two, or more different base stations). Process flow 700 may also include UE 115-*f*, which may be an example of a corresponding UE 115 as described above with reference to FIG. 1-6.

In the following description of the process flow 700, the operations between UE 115-*f*, TRP 105-*k*, and TRP 105-*l* may be performed in different orders or at different times. Certain operations may also be left out of the process flow 700, or other operations may be added to the process flow 700. While UE 115-*f*, TRP 105-*k*, and TRP 105-*l* are shown performing the operations of process flow 700, any wireless device may perform the operations shown.

At 705, UE 115-*f* may determine a channel quality associated with each of a set of TRPs, set of antenna subarrays (for example, antenna panels) of UE 115-*f*, or a combination thereof.

At 710, UE 115-*f* may transmit, while operating in a DRX mode (for example, a CDRX mode), an SR including an indication of the set of antenna subarrays of UE 115-*f*, or a set of TRPs, or a combination thereof with which to perform an SR operation. In some implementations, UE 115-*f* may determine the set of antenna subarrays of UE 115-*f* or the set of TRPs to include in the indication based on the channel quality determination of 705. Additionally, UE 115-*f* may transmit the SR on an uplink control channel (for example, a PUCCH). In some implementations, UE 115-*f* may receive a configuration message from one of the TRPs configured for communications with UE 115-*f* (for example, TRP 105-*k* or an anchor TRP) that includes information for UE 115-*f* to transmit the SR. For example, the configuration message may include information on a channel to be used for transmitting the SR (for example, a PUCCH) and information on additional channels for transmitting or receiving additional messages of the SR operation (for example, a PDCCH and PUSCH).

At 715, UE 115-*f* may receive an uplink grant in response to the transmitted SR. In some implementations, UE 115-*f* may receive the uplink grant using the set of antenna subarrays of UE 115-*f* indicated in the transmitted SR. Additionally, the set of antenna subarrays may include multiple antenna subarrays of UE 115-*f*. In some implementations, UE 115-*f* may receive the uplink grant on a downlink control channel (for example, a PDCCH).

At 720, UE 115-*f* may transmit uplink data based on the received uplink grant and the indication in the transmitted SR. In some implementations, the set of TRPs may include multiple TRPs, and UE 115-*f* may transmit, based on the received uplink grant and the indication in the transmitted SR, uplink data to the multiple TRPs. Additionally, UE 115-*f* may transmit the uplink data to the multiple TRPs using multiple antenna subarrays, where the set of antenna arrays included in the indication in the transmitted SR include the multiple antenna subarrays. In some examples, UE 115-*f* may transmit the SR using a second antenna subarray of the set of antenna subarrays of UE 115-*f* and may transmit the uplink data on a first antenna subarray of the set of antenna subarrays of UE 115-*f* different than the second antenna subarray. Additionally, UE 115-*f* may transmit the uplink data on an uplink shared channel (for example, a PUSCH). In some implementations, UE 115-*f* may receive the uplink grant using the set of antenna subarrays as indicated in the transmitted SR that includes a second antenna subarray different than a first antenna subarray of the set of antenna subarrays used to transmit the uplink data.

Figure 8:
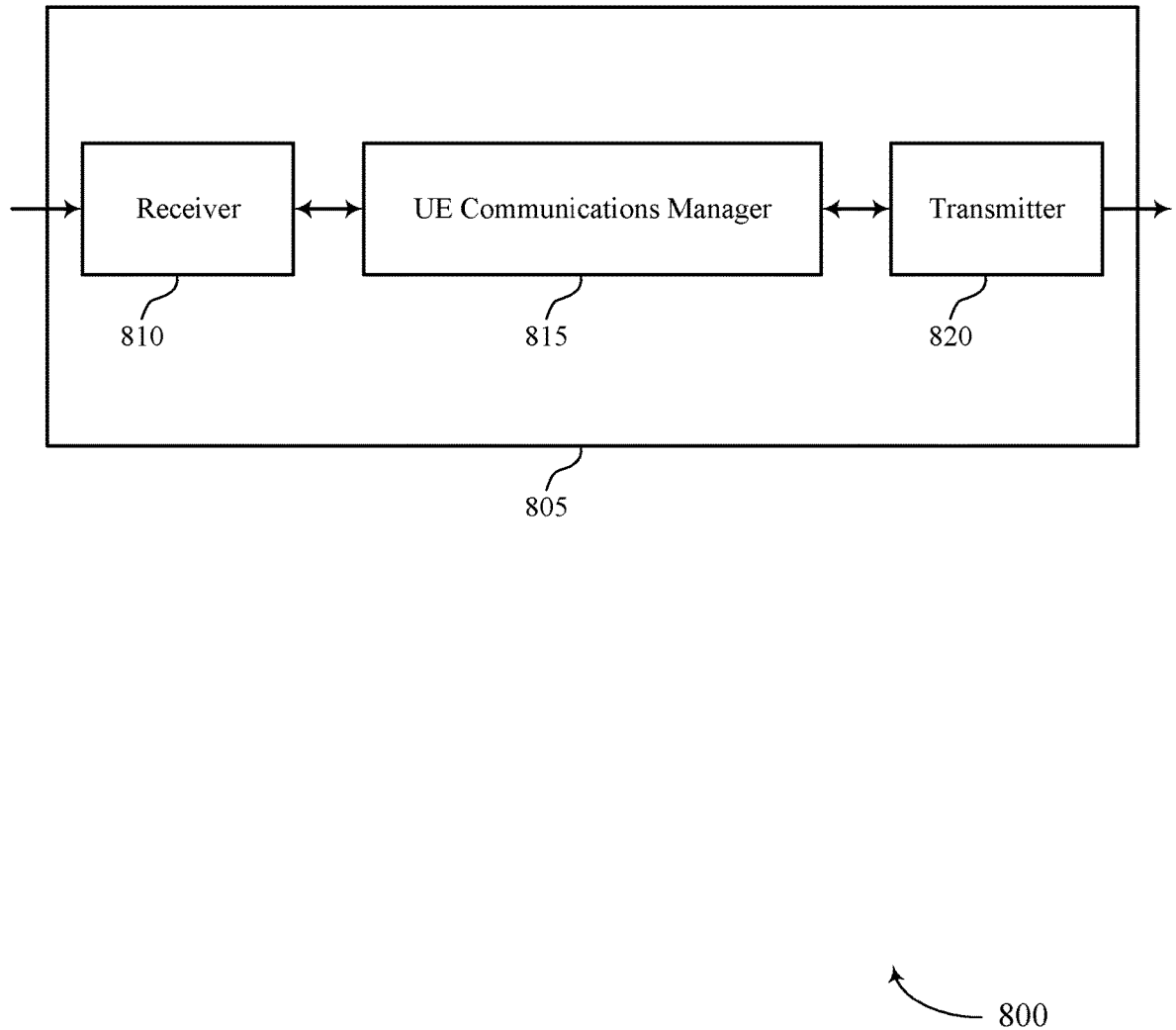
FIGS. 8 and 9 show block diagrams of devices that support an SR operation in a CDRX mode in accordance with aspects of the present disclosure.

FIG. 8 shows a block diagram 800 of a device 805 that supports SR operation in a CDRX mode in accordance with aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (for example, via one or more buses).

The receiver 810 may receive information such as packets, user data, or control information associated with various information channels (for example, control channels, data channels, and information related to SR operation in a CDRX mode). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may receive a configuration indicating a set of antenna subarrays of the UE, or a set of TRPs, or a combination thereof, for the UE to use to communicate while operating in a DRX mode. Additionally, the UE communications manager 815 may transmit, based on the received configuration, an SR while operating in the DRX mode. In some implementations, the UE communications manager 815 may receive an uplink grant in response to the transmitted SR. Subsequently, the UE communications manager 815 may transmit uplink data based on the received uplink grant and the received configuration.

Additionally or alternatively, the UE communications manager 815 may transmit, while operating in a DRX mode, an SR including an indication of a set of antenna subarrays of the UE, or a set of TRPs, or a combination thereof. In some implementations, the UE communications manager 815 may receive an uplink grant in response to the transmitted SR. Additionally, the UE communications manager 815 may transmit uplink data based on the received uplink grant and the indication in the transmitted SR. The UE communications manager 815 may be an example of aspects of the UE communications manager 1110 described herein.

In some examples, the UE communications manager 815 as described herein may be implemented to realize one or more potential advantages. For example, by using a configuration of a set of antenna subarrays (for example, as indication by a TRP or determined by the UE communications manager 815) for performing an SR operation, the UE communications manager 815 may enable a UE 115 to perform the SR operation with higher reliability. Rather than using different antenna subarrays or attempting to perform the SR operation with different TRPs, the UE communications manager 815 may use the configuration of the set of antenna subarrays to perform the SR operation with corresponding TRPs that correspond to the antenna subarrays (for example, TRP-antenna subarray pairs), where the configuration of the set of antenna subarrays is chosen for efficiently performing the SR operation. Based on using this configuration of the set of antennas, the UE communications manager 815 may enable the UE 115 to reduce signaling overhead and save power from not performing multiple SR operations with less efficient antenna subarrays and with other TRPs.

The UE communications manager 815, or its sub-components, may be implemented in hardware, code (for example, software or firmware) executed by a processor, or any combination thereof. If implemented in code executed by a processor, the functions of the UE communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 815, or its sub-components, may be physically located at different locations, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
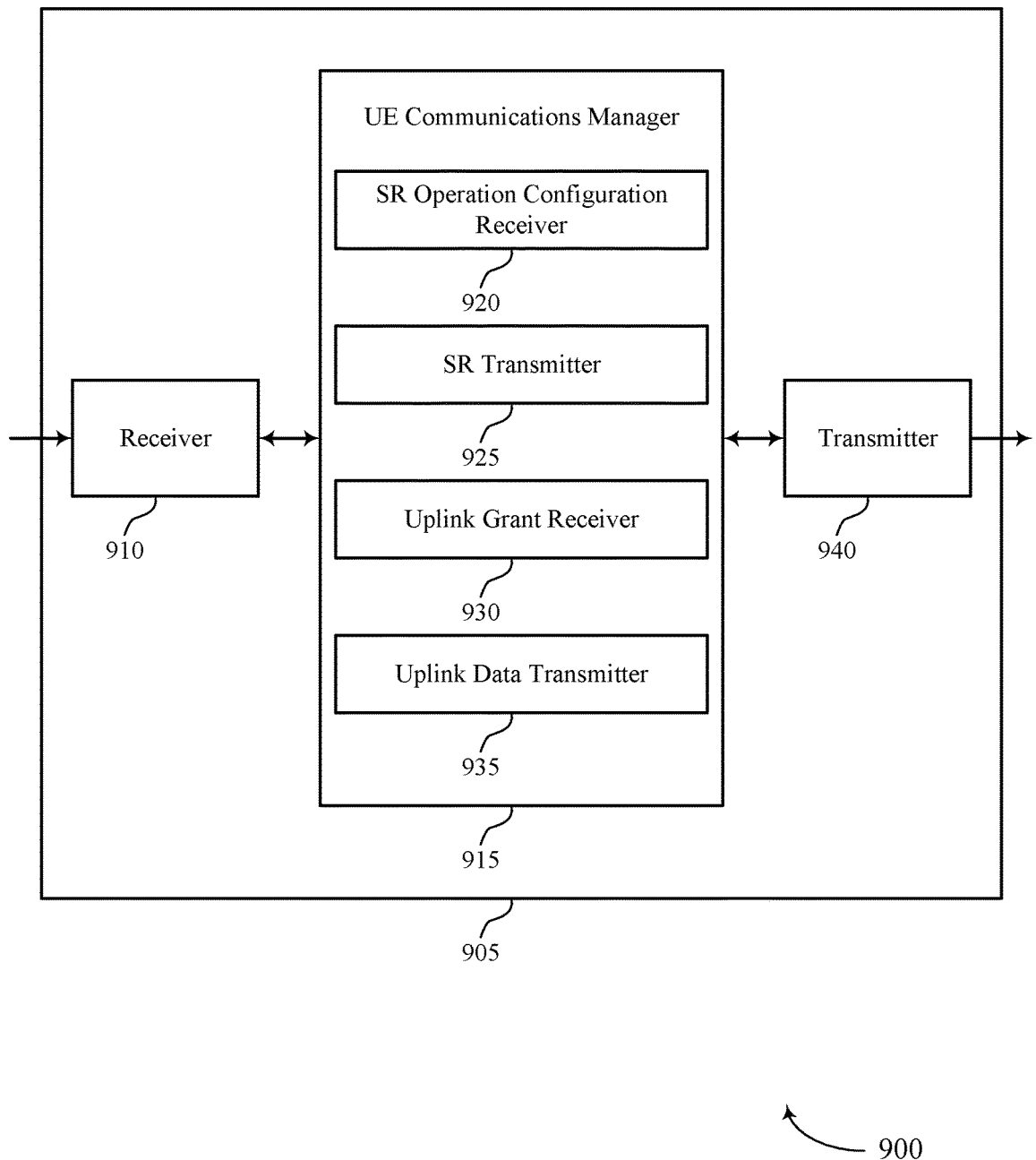

FIG. 9 shows a block diagram 900 of a device 905 that supports SR operation in a CDRX mode in accordance with aspects of the present disclosure. The device 905 may be an example of aspects of a device 805, or a UE 115 as described herein. The device 905 may include a receiver 910, a UE communications manager 915, and a transmitter 940. The device 905 may also include a processor. Each of these components may be in communication with one another (for example, via one or more buses).

The receiver 910 may receive information such as packets, user data, or control information associated with various information channels (for example, control channels, data channels, and information related to SR operation in a CDRX mode). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include an SR operation configuration receiver 920, an SR transmitter 925, an uplink grant receiver 930, and an uplink data transmitter 935. The UE communications manager 915 may be an example of aspects of the UE communications manager 1110 described herein.

The SR operation configuration receiver 920 may receive a configuration indicating a set of antenna subarrays of the UE, or a set of TRPs, or a combination thereof, for the UE to use to communicate while operating in a DRX mode.

The SR transmitter 925 may transmit, based on the received configuration, an SR while operating in the DRX mode. Additionally or alternatively, the SR transmitter 925 may transmit, while operating in a DRX mode, an SR including an indication of a set of antenna subarrays of the UE, or a set of TRPs, or a combination thereof.

The uplink grant receiver 930 may receive an uplink grant in response to the transmitted SR.

The uplink data transmitter 935 may transmit uplink data based on the received uplink grant and the received configuration. Additionally or alternatively, the uplink data transmitter 935 may transmit uplink data based on the received uplink grant and the indication in the transmitted SR.

Based on techniques for transmitting the SR based on a configuration of the antenna subarrays (for example, indicated by a TRP or determined by a UE 115), a processor of the UE 115 (e.g., controlling the receiver 910, the transmitter 940, or the transceiver 1120 as described with reference to FIG. 11) may save battery life by transmitting the SR with a higher reliability that the SR is transmitted successfully by using the configuration of the antenna subarrays. Additionally, the processor may reduce signaling overhead from performing multiple SR operations with less efficient antenna subarrays and TRPs than those included with the configuration.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
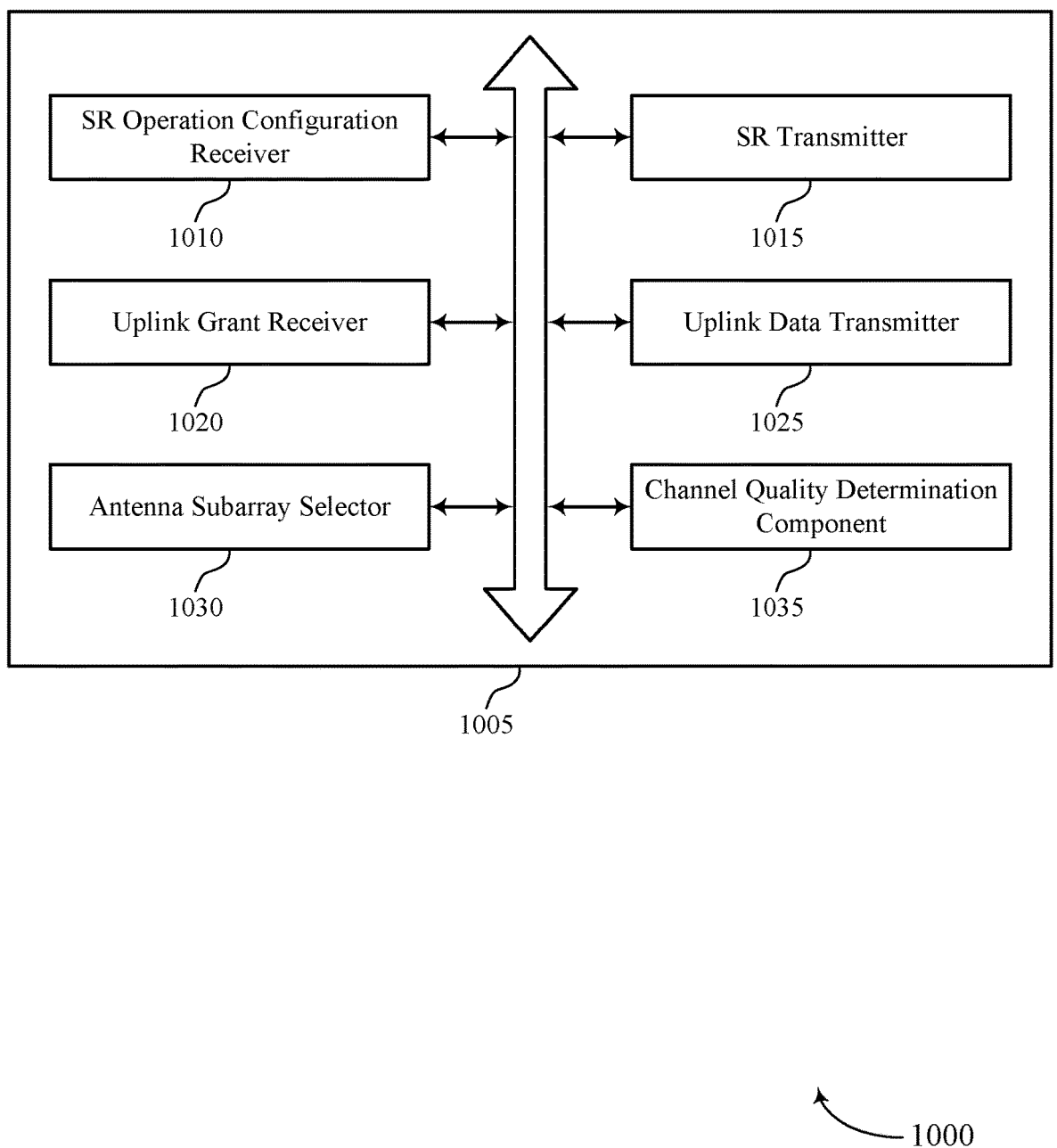
FIG. 10 shows a block diagram of a UE communications manager that supports an SR operation in a CDRX mode in accordance with aspects of the present disclosure.

FIG. 10 shows a block diagram 1000 of a UE communications manager 1005 that supports SR operation in a CDRX mode in accordance with aspects of the present disclosure. The UE communications manager 1005 may be an example of aspects of a UE communications manager 815, a UE communications manager 915, or a UE communications manager 1110 described herein. The UE communications manager 1005 may include an SR operation configuration receiver 1010, an SR transmitter 1015, an uplink grant receiver 1020, an uplink data transmitter 1025, an antenna subarray selector 1030, and a channel quality determination component 1035. Each of these modules may communicate, directly or indirectly, with one another (for example, via one or more buses).

The SR operation configuration receiver 1010 may receive a configuration indicating a set of antenna subarrays of the UE, or a set of TRPs, or a combination thereof, for the UE to use to communicate while operating in a DRX mode. In some examples, the SR operation configuration receiver 1010 may receive the configuration in one or more of RRC, DCI, or a MAC-CE.

The SR transmitter 1015 may transmit, based on the received configuration, an SR while operating in the DRX mode. Additionally or alternatively, the SR transmitter 1015 may transmit, while operating in a DRX mode, an SR including an indication of a set of antenna subarrays of the UE, or a set of TRPs, or a combination thereof. In some examples, the SR transmitter 1015 may transmit the SR to a set of TRPs using a set of antenna subarrays of the UE, where the set of TRPs of the UE include the set of TRPs, and the set of antenna subarrays include the set of antenna subarrays. In other examples, the SR transmitter 1015 may transmit the SR using the set of antenna subarrays indicated by the received configuration, the set of antenna subarrays including a subset of a set of antenna subarrays of the UE.

The uplink grant receiver 1020 may receive an uplink grant in response to the transmitted SR. In some examples, the uplink grant receiver 1020 may receive, from a first TRP of the set of TRPs, the uplink grant for the first TRP in response to the transmitted SR. Additionally or alternatively, the uplink grant receiver 1020 may receive, from a second TRP of the set of TRPs, an uplink grant for the second TRP in response to the transmitted SR. In some examples, the uplink grant receiver 1020 may receive, from each TRP of the set of TRPs, an uplink grant for the TRP in response to the transmitted SR. Additionally or alternatively, the uplink grant receiver 1020 may receive the uplink grant using the set of antenna subarrays of the UE indicated in the transmitted SR. In some implementations, the SR may be transmitted to a first TRP of the set of TRPs, and the uplink grant may be received from the first TRP in response to the transmitted SR. Additionally or alternatively, the set of antenna subarrays may include a second antenna subarray different than a first antenna subarray of the set of antenna subarrays used to transmit the uplink data. In some implementations, the set of antenna subarrays may include multiple antenna subarrays.

The uplink data transmitter 1025 may transmit uplink data based on the received uplink grant and the received configuration. Additionally or alternatively, the uplink data transmitter 1025 may transmit uplink data based on the received uplink grant and the indication in the transmitted SR. In some examples, the uplink data transmitter 1025 may transmit uplink data to each of the set of TRPs. In other examples, the uplink data transmitter 1025 may identify one or more TRPs of the set of TRPs as having transmitted an uplink grant in response to the transmitted SR. Additionally or alternatively, the uplink data transmitter 1025 may transmit, based on the identifying, uplink data to the one or more TRPs. In some implementations, the uplink data transmitter 1025 may transmit, based on the received uplink grant and the indication in the transmitted SR, uplink data to the set of TRPs. In some examples, the uplink data transmitter 1025 may transmit the uplink data to the set of TRPs using a set of antenna subarrays of the UE, the set of antenna subarrays including the set of antenna subarrays.

In some implementations, the SR may be transmitted on an uplink control channel (for example, a PUCCH), the uplink grant may be received on a downlink control channel (for example, a PDCCH), and the uplink data may be transmitted on an uplink shared channel (for example, a PUSCH). Additionally, the SR may be transmitted using a second antenna subarray of the set of antenna subarrays of the UE, the second antenna subarray different than a first antenna subarray of the set of antenna subarrays used to transmit the uplink data.

The antenna subarray selector 1030 may select, by the UE, at least one antenna subarray of a set of antenna subarrays of the UE to use transmit the SR, or receive the uplink grant, or transmit the uplink data, or a combination thereof.

The channel quality determination component 1035 may determine a channel quality associated with each of the set of TRPs and may determine the set of TRPs based on the determined channel quality, where the transmitted SR indicates the determined set of TRPs. Additionally or alternatively, the channel quality determination component 1035 may determine a channel quality associated with each of the set of antenna subarrays of the UE and may determine the set of antenna subarrays based on the determined channel quality, where the transmitted SR indicates the determined set of antenna subarrays.

Figure 11:
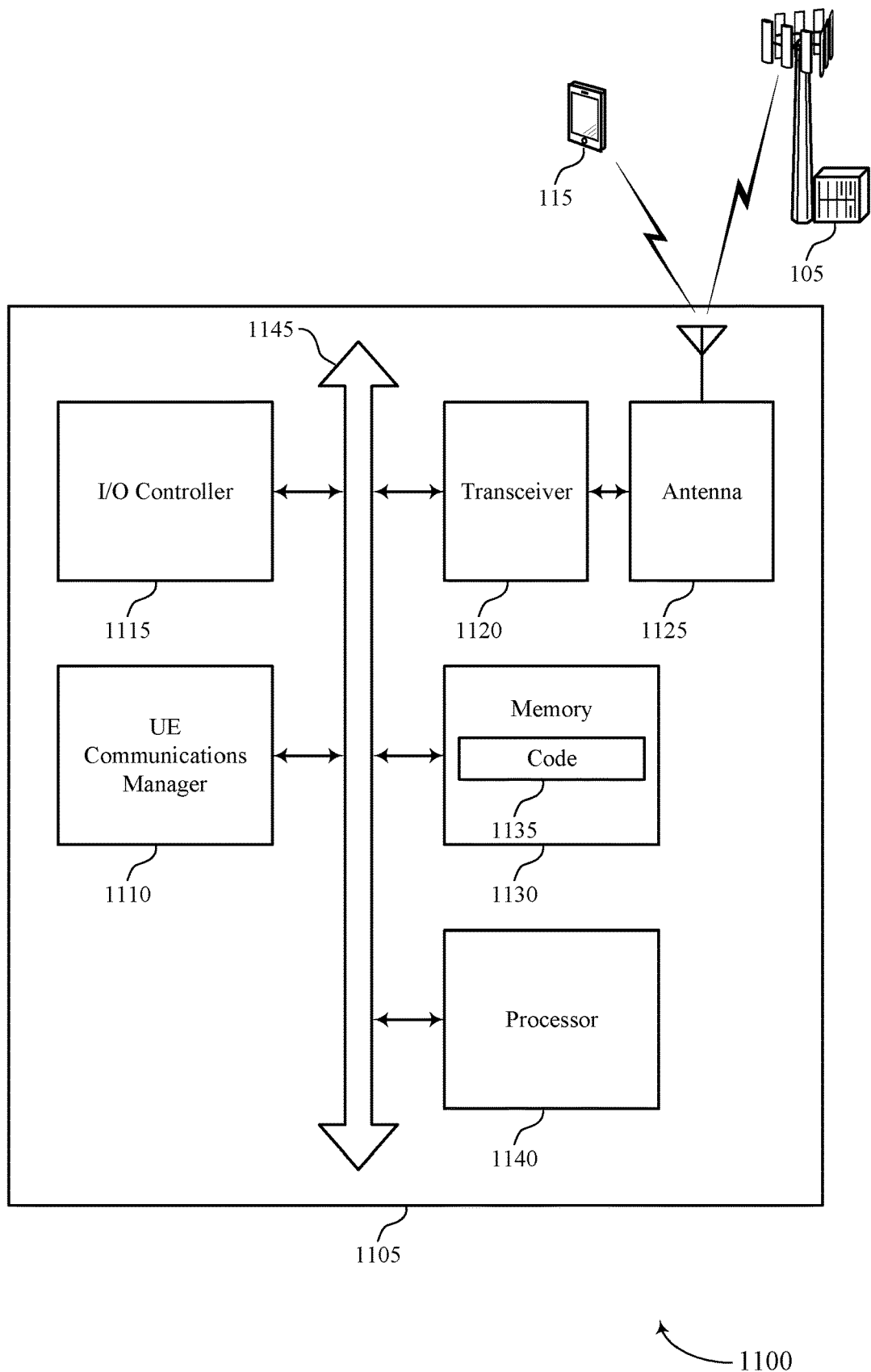
FIG. 11 shows a diagram of a system including a device that supports an SR operation in a CDRX mode in accordance with aspects of the present disclosure.

FIG. 11 shows a diagram of a system 1100 including a device 1105 that supports SR operation in a CDRX mode in accordance with aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (for example, bus 1145).

The UE communications manager 1110 may receive a configuration indicating a set of antenna subarrays of the UE, or a set of TRPs, or a combination thereof, for the UE to use to communicate while operating in a DRX mode. In some implementations, the UE communications manager 1110 may transmit, based on the received configuration, an SR while operating in the DRX mode. Additionally, the UE communications manager 1110 may receive an uplink grant in response to the transmitted SR. Subsequently, the UE communications manager 1110 may transmit uplink data based on the received uplink grant and the received configuration.

Additionally or alternatively, the UE communications manager 1110 may transmit, while operating in a DRX mode, an SR including an indication of a set of antenna subarrays of the UE, or a set of TRPs, or a combination thereof. In some implementations, the UE communications manager 1110 may receive an uplink grant in response to the transmitted SR. Additionally, the UE communications manager 1110 may transmit uplink data based on the received uplink grant and the indication in the transmitted SR.

The I/O controller 1115 may manage input and output signals for the device 1105. The I/O controller 1115 may also manage peripherals not integrated into the device 1105. In some implementations, the I/O controller 1115 may represent a physical connection or port to an external peripheral. In some implementations, the I/O controller 1115 may utilize an operating system such as iOS®, ANDROID®, MS-DOS®, MS-WINDOWS®, OS/2®, UNIX®, LINUX®, or another known operating system. In other implementations, the I/O controller 1115 may represent or interact with a modem, a keyboard, a mouse, a touchscreen, or a similar device. In some implementations, the I/O controller 1115 may be implemented as part of a processor. In some implementations, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some implementations, the wireless device may include a single antenna 1125. However, in some implementations the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some implementations, the memory 1130 may contain, among other things, a basic I/O system (BIOS) which may control basic hardware or software operation such as the interaction with peripheral components or devices.

The processor 1140 may include an intelligent hardware device, (for example, a general-purpose processor, a DSP, a central processing unit (CPU), a microcontroller, an ASIC, an FPGA, a programmable logic device, a discrete gate or transistor logic component, a discrete hardware component, or any combination thereof). In some implementations, the processor 1140 may be configured to operate a memory array using a memory controller. In other implementations, a memory controller may be integrated into the processor 1140. The processor 1140 may be configured to execute computer-readable instructions stored in a memory (for example, the memory 1130) to cause the device 1105 to perform various functions (for example, functions or tasks supporting SR operation in a CDRX mode).

The code 1135 may include instructions to implement aspects of the present disclosure, including instructions to support wireless communications. The code 1135 may be stored in a non-transitory computer-readable medium such as system memory or other type of memory. In some implementations, the code 1135 may not be directly executable by the processor 1140 but may cause a computer (for example, when compiled and executed) to perform functions described herein.

Figure 12:
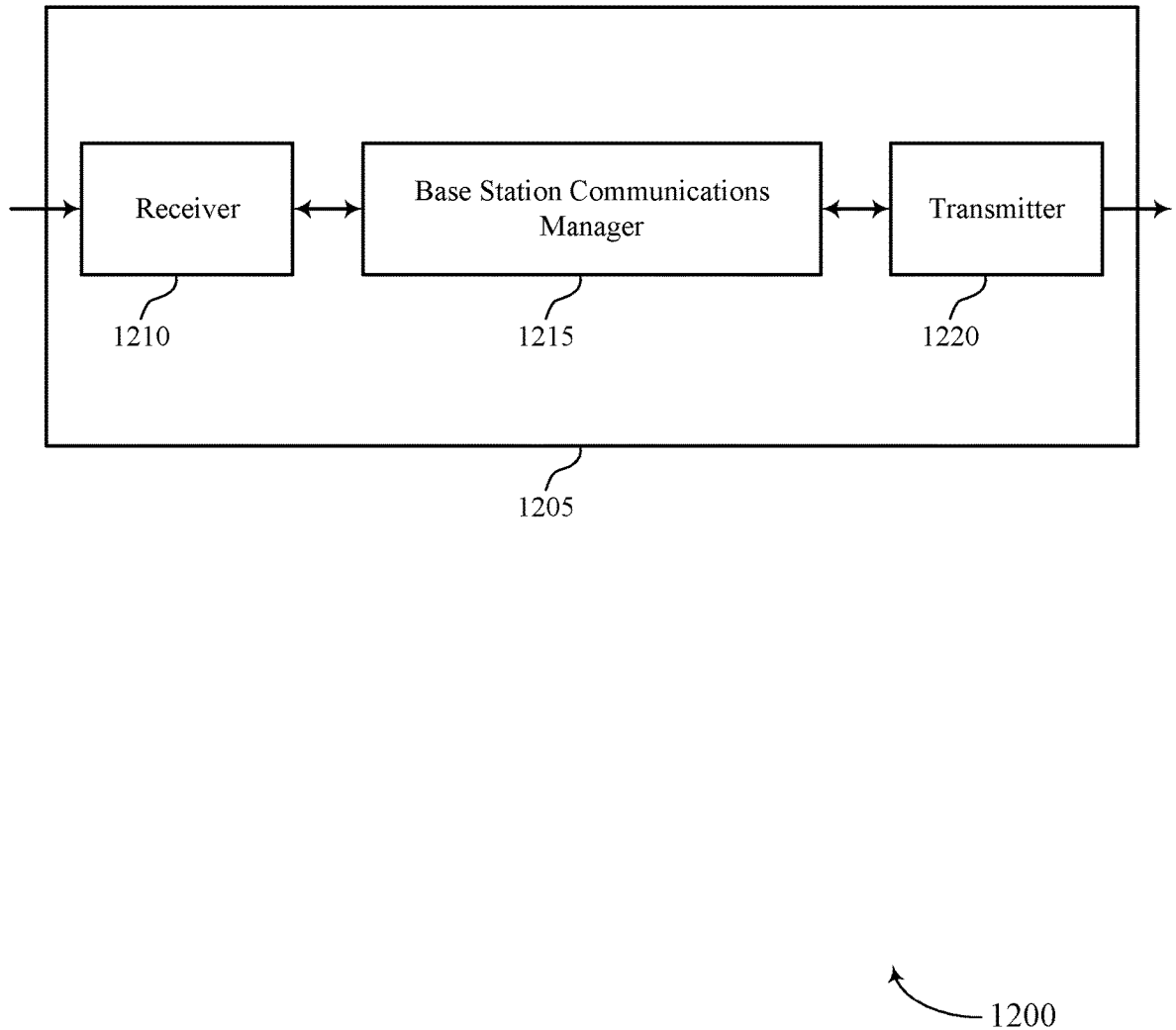
FIGS. 12 and 13 show block diagrams of devices that support an SR operation in a CDRX mode in accordance with aspects of the present disclosure.

FIG. 12 shows a block diagram 1200 of a device 1205 that supports SR operation in a CDRX mode in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (for example, via one or more buses).

The receiver 1210 may receive information such as packets, user data, or control information associated with various information channels (for example, control channels, data channels, and information related to SR operation in a CDRX mode). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may transmit, to a UE, a configuration indicating a set of antenna subarrays of the UE, or a set of TRPs, or a combination thereof, for the UE to use to communicate while operating in a DRX mode. In some implementations, the base station communications manager 1215 may receive an SR from the UE based on the transmitted configuration. Additionally, the base station communications manager 1215 may transmit, to the UE, an uplink grant in response to the received SR. Subsequently, the base station communications manager 1215 may receive uplink data from the UE based on the transmitted uplink grant.

Additionally or alternatively, the base station communications manager 1215 may receive an SR from a UE operating in a DRX mode, the SR including an indication of a set of antenna subarrays of the UE, or a set of TRPs, or a combination thereof. In some implementations, the base station communications manager 1215 may transmit an uplink grant to the UE in response to the received SR. Additionally, the base station communications manager 1215 may receive uplink data based on the transmitted uplink grant and the indication in the received SR. The base station communications manager 1215 may be an example of aspects of the base station communications manager 1510 described herein.

The base station communications manager 1215, or its sub-components, may be implemented in hardware, code (for example, software or firmware) executed by a processor, or any combination thereof. If implemented in code executed by a processor, the functions of the base station communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215, or its sub-components, may be physically located at different locations, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
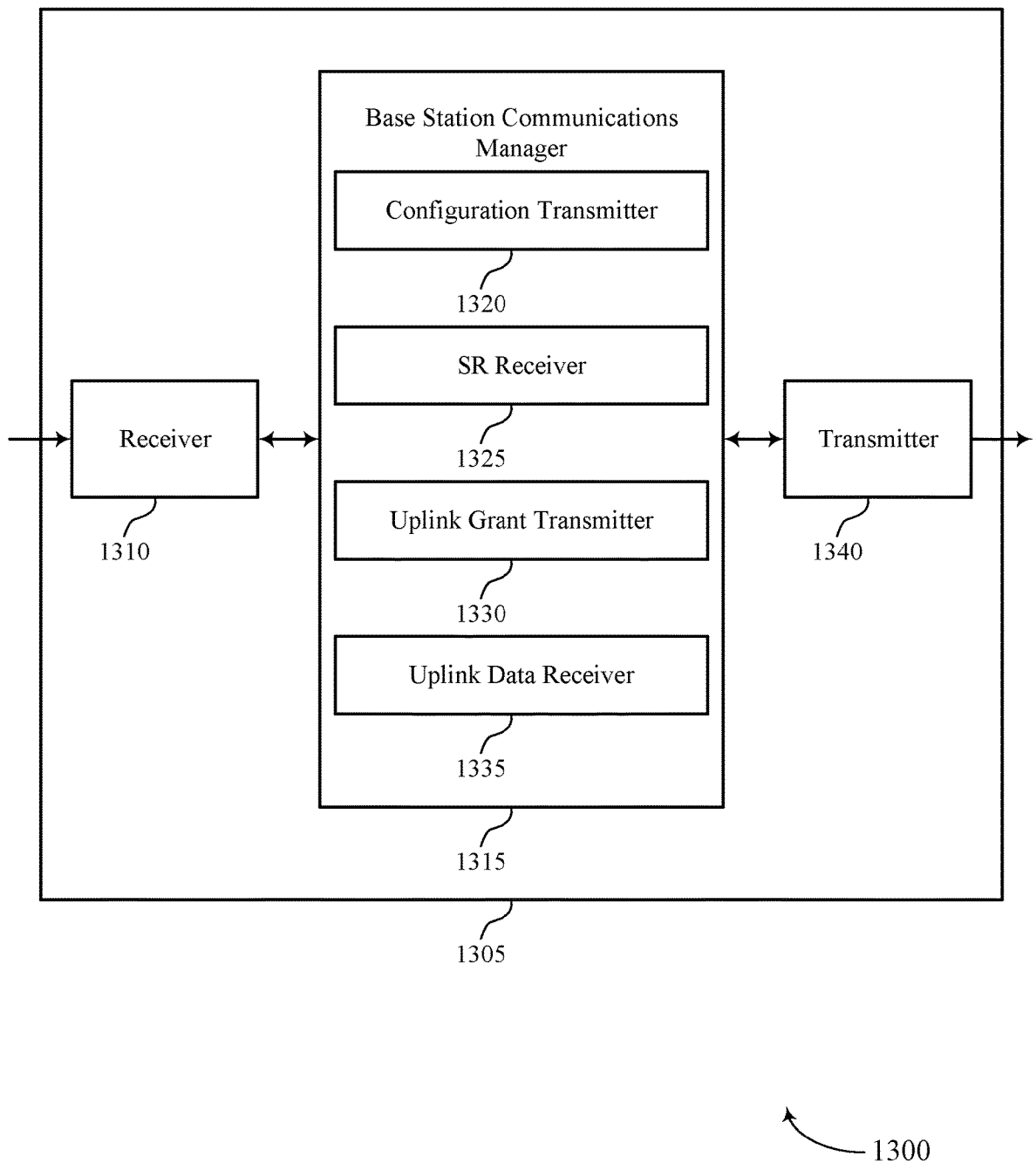

FIG. 13 shows a block diagram 1300 of a device 1305 that supports SR operation in a CDRX mode in accordance with aspects of the present disclosure. The device 1305 may be an example of aspects of a device 1205, or a base station 105 as described herein. The device 1305 may include a receiver 1310, a base station communications manager 1315, and a transmitter 1340. The device 1305 may also include a processor. Each of these components may be in communication with one another (for example, via one or more buses).

The receiver 1310 may receive information such as packets, user data, or control information associated with various information channels (for example, control channels, data channels, and information related to SR operation in a CDRX mode). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a configuration transmitter 1320, an SR receiver 1325, an uplink grant transmitter 1330, and an uplink data receiver 1335. The base station communications manager 1315 may be an example of aspects of the base station communications manager 1510 described herein.

The configuration transmitter 1320 may transmit, to a UE, a configuration indicating a set of antenna subarrays of the UE, or a set of TRPs, or a combination thereof, for the UE to use to communicate while operating in a DRX mode.

The SR receiver 1325 may receive an SR from the UE based on the transmitted configuration. Additionally or alternatively, the SR receiver 1325 may receive an SR from a UE operating in a DRX mode, the SR including an indication of a set of antenna subarrays of the UE, or a set of TRPs, or a combination thereof.

The uplink grant transmitter 1330 may transmit, to the UE, an uplink grant in response to the received SR.

The uplink data receiver 1335 may receive uplink data from the UE based on the transmitted uplink grant. Additionally or alternatively, the uplink data receiver 1335 may receive uplink data based on the transmitted uplink grant and the indication in the received SR.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
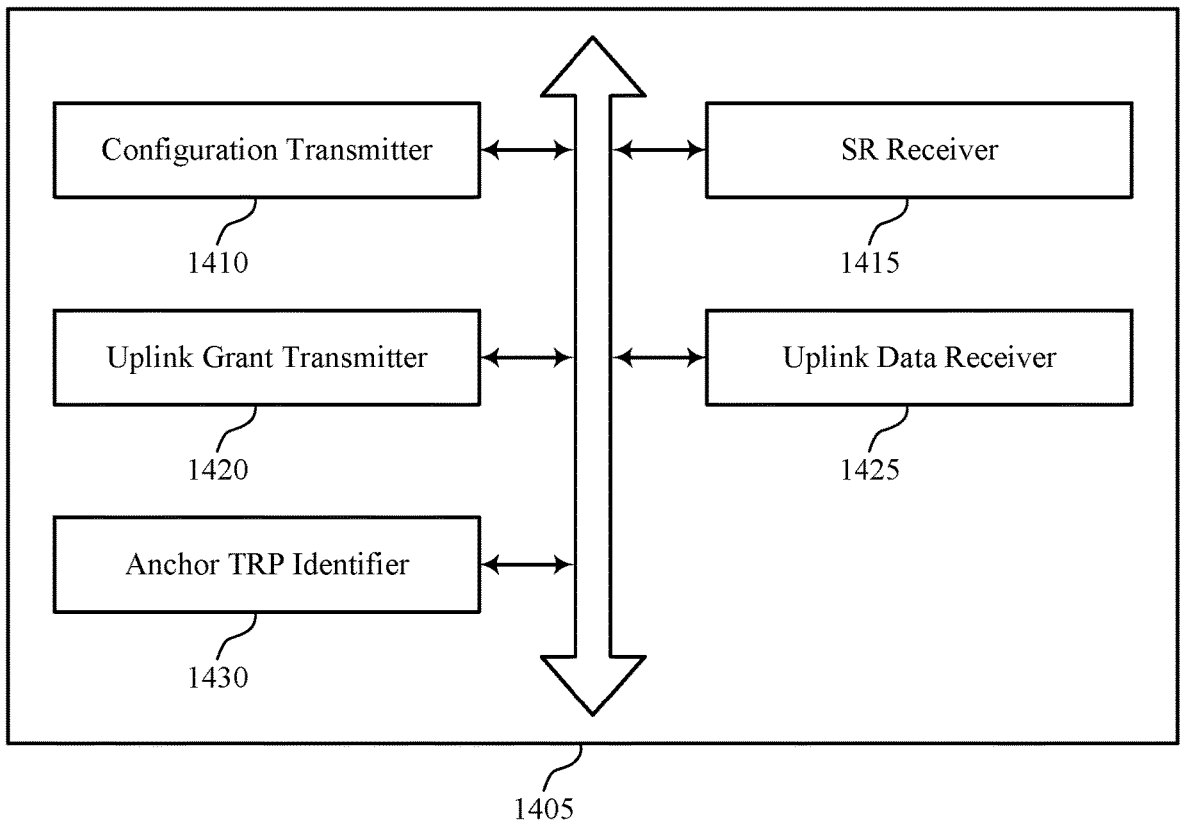
FIG. 14 shows a block diagram of a base station communications manager that supports an SR operation in a CDRX mode in accordance with aspects of the present disclosure.

FIG. 14 shows a block diagram 1400 of a base station communications manager 1405 that supports SR operation in a CDRX mode in accordance with aspects of the present disclosure. The base station communications manager 1405 may be an example of aspects of a base station communications manager 1215, a base station communications manager 1315, or a base station communications manager 1510 described herein. The base station communications manager 1405 may include a configuration transmitter 1410, an SR receiver 1415, an uplink grant transmitter 1420, an uplink data receiver 1425, and an anchor TRP identifier 1430. Each of these modules may communicate, directly or indirectly, with one another (for example, via one or more buses).

The configuration transmitter 1410 may transmit, to a UE, a configuration indicating a set of antenna subarrays of the UE, or a set of TRPs, or a combination thereof, for the UE to use to communicate while operating in a DRX mode. In some examples, the configuration transmitter 1410 may transmit the configuration in one or more of RRC signaling, DCI, or a MAC-CE.

The SR receiver 1415 may receive an SR from the UE based on the transmitted configuration. Additionally or alternatively, the SR receiver 1415 may receive an SR from a UE operating in a DRX mode, the SR including an indication of a set of antenna subarrays of the UE, or a set of TRPs, or a combination thereof. In some examples, the SR receiver 1415 may receive the SR via a set of TRPs, where each of the set of TRPs monitor for SRs from the UE. In other examples, the SR receiver 1415 may receive the SR via one TRP of the set of TRPs, where each of the set of TRPs monitor for SRs from the UE. In some implementations, the indicated set of TRPs may be determined based on a channel quality associated with each of the set of TRPs, or the set of antenna subarrays, or a combination thereof. Additionally or alternatively, the indicated set of antenna subarrays are determined based on a channel quality associated with each of the set of TRPs, or the set of antenna subarrays, or a combination thereof.

The uplink grant transmitter 1420 may transmit, to the UE, an uplink grant in response to the received SR. In some examples, the uplink grant transmitter 1420 may transmit, via a second TRP of the set of TRPs in response to the received SR, a second uplink grant for the second TRP. In some implementations, the uplink grant transmitter 1420 may determine to refrain from transmitting an uplink grant via a second TRP of the set of TRPs based on determining that the base station failed to receive a second SR via the second TRP. Additionally or alternatively, the uplink grant transmitter 1420 may transmit the uplink grant via at least one of the set of TRPs indicated in the received SR. In some examples, the uplink grant transmitter 1420 may determine one TRP of the set of TRPs indicated in the received SR, the uplink grant transmitted via the determined one TRP. In other examples, the uplink grant transmitter 1420 may determine a set of TRPs of the set of TRPs indicated in the received SR, the uplink grant transmitted via the determined set of TRPs. In some implementations, the SR may be received via a first TRP of the set of TRPs, and the uplink grant may be transmitted via the first TRP in response to the received SR.

The uplink data receiver 1425 may receive uplink data from the UE based on the transmitted uplink grant. Additionally or alternatively, the uplink data receiver 1425 may receive uplink data based on the transmitted uplink grant and the indication in the received SR. In some examples, the uplink data receiver 1425 may receive uplink data via each of a set of TRPs, where the set of TRPs includes the set of TRPs. In other examples, the uplink data receiver 1425 may identify one or more TRPs of the set of TRPs as having transmitted an uplink grant in response to the received SR. Additionally or alternatively, the uplink data receiver 1425 may receive, based on the identifying, uplink data from the UE via the one or more TRPs. In some examples, the uplink data receiver 1425 may receive, based on the transmitted uplink grant and the indication in the received SR, uplink data from the UE via multiple TRPs, the set of TRPs including the multiple TRPs.

In some implementations, the SR may be received on an uplink control channel (for example, a PUCCH), the uplink grant may be transmitted on a downlink control channel (for example, a PDCCH), and the uplink data may be received on an uplink shared channel (for example, a PUSCH). Additionally, the SR may be received via a second TRP of the set of TRPs different than a first TRP of the set of TRPs used to receive the uplink data.

The anchor TRP identifier 1430 may identify an anchor TRP of the set of TRPs, where the anchor TRP monitors for SRs from the UE and may receive the SR via the anchor TRP.

Figure 15:
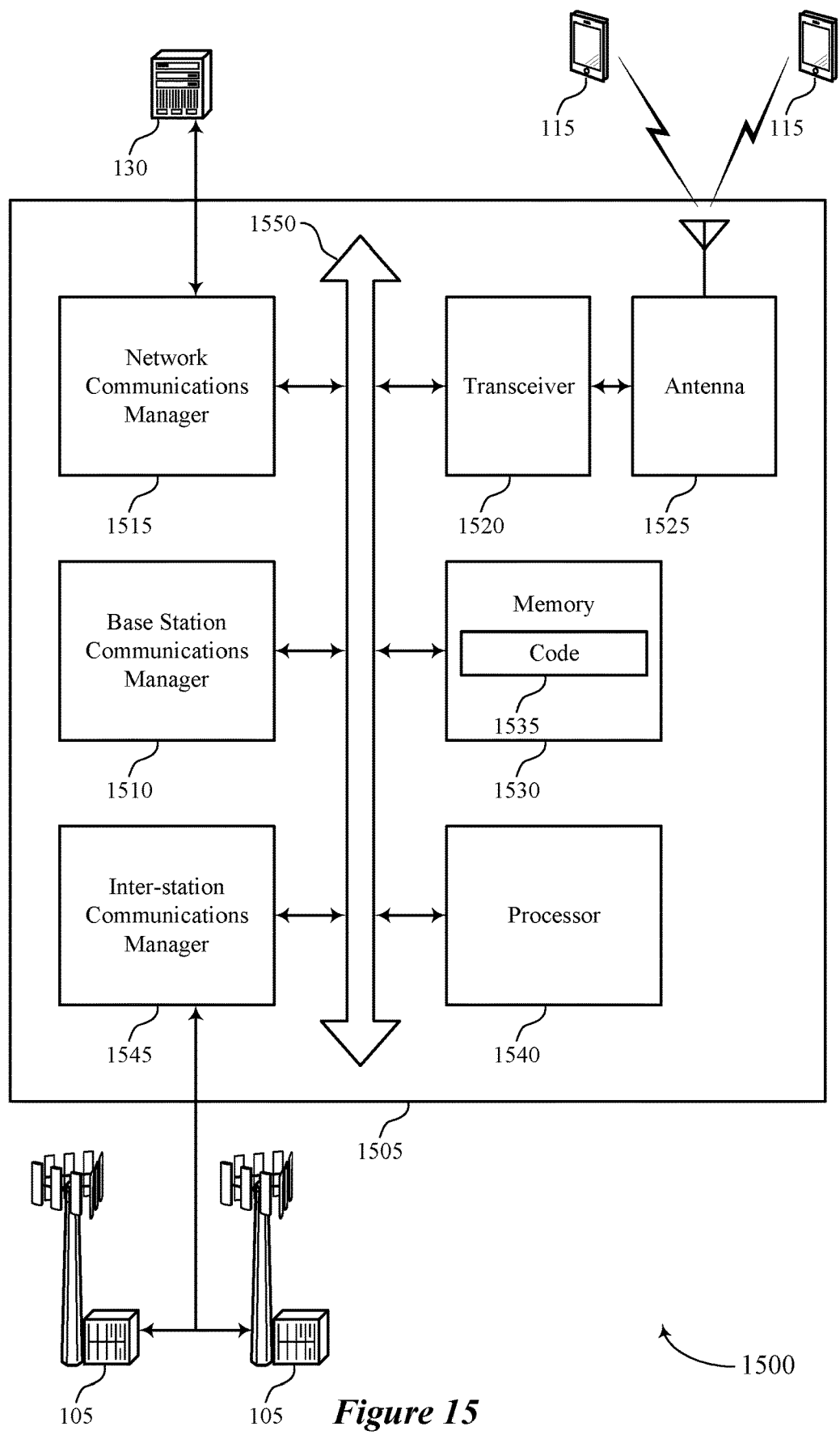
FIG. 15 shows a diagram of a system including a device that supports an SR operation in a CDRX mode in accordance with aspects of the present disclosure.

FIG. 15 shows a diagram of a system 1500 including a device 1505 that supports SR operation in a CDRX mode in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (for example, bus 1550).

The base station communications manager 1510 may transmit, to a UE, a configuration indicating a set of antenna subarrays of the UE, or a set of TRPs, or a combination thereof, for the UE to use to communicate while operating in a DRX mode. In some implementations, the base station communications manager 1510 may receive an SR from the UE based on the transmitted configuration. Additionally, the base station communications manager 1510 may transmit, to the UE, an uplink grant in response to the received SR, and receive uplink data from the UE based on the transmitted uplink grant.

Additionally or alternatively, the base station communications manager 1510 may receive an SR from a UE operating in a DRX mode, the SR including an indication of a set of antenna subarrays of the UE, or a set of TRPs, or a combination thereof. In some implementations, the base station communications manager 1510 may transmit an uplink grant to the UE in response to the received SR. Additionally, the base station communications manager 1510 may receive uplink data based on the transmitted uplink grant and the indication in the received SR.

The network communications manager 1515 may manage communications with the core network (for example, via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some implementations, the wireless device may include a single antenna 1525. However, in some implementations the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (for example, the processor 1540) cause the device to perform various functions described herein. In some implementations, the memory 1530 may contain, among other things, a BIOS which may control basic hardware or software operation such as the interaction with peripheral components or devices.

The processor 1540 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 1540 may be configured to operate a memory array using a memory controller. In some implementations, a memory controller may be integrated into processor 1540. The processor 1540 may be configured to execute computer-readable instructions stored in a memory (for example, the memory 1530) to cause the device 1505 to perform various functions (for example, functions or tasks supporting SR operation in a CDRX mode).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some implementations, the code 1535 may not be directly executable by the processor 1540 but may cause a computer (for example, when compiled and executed) to perform functions described herein.

Figure 16:
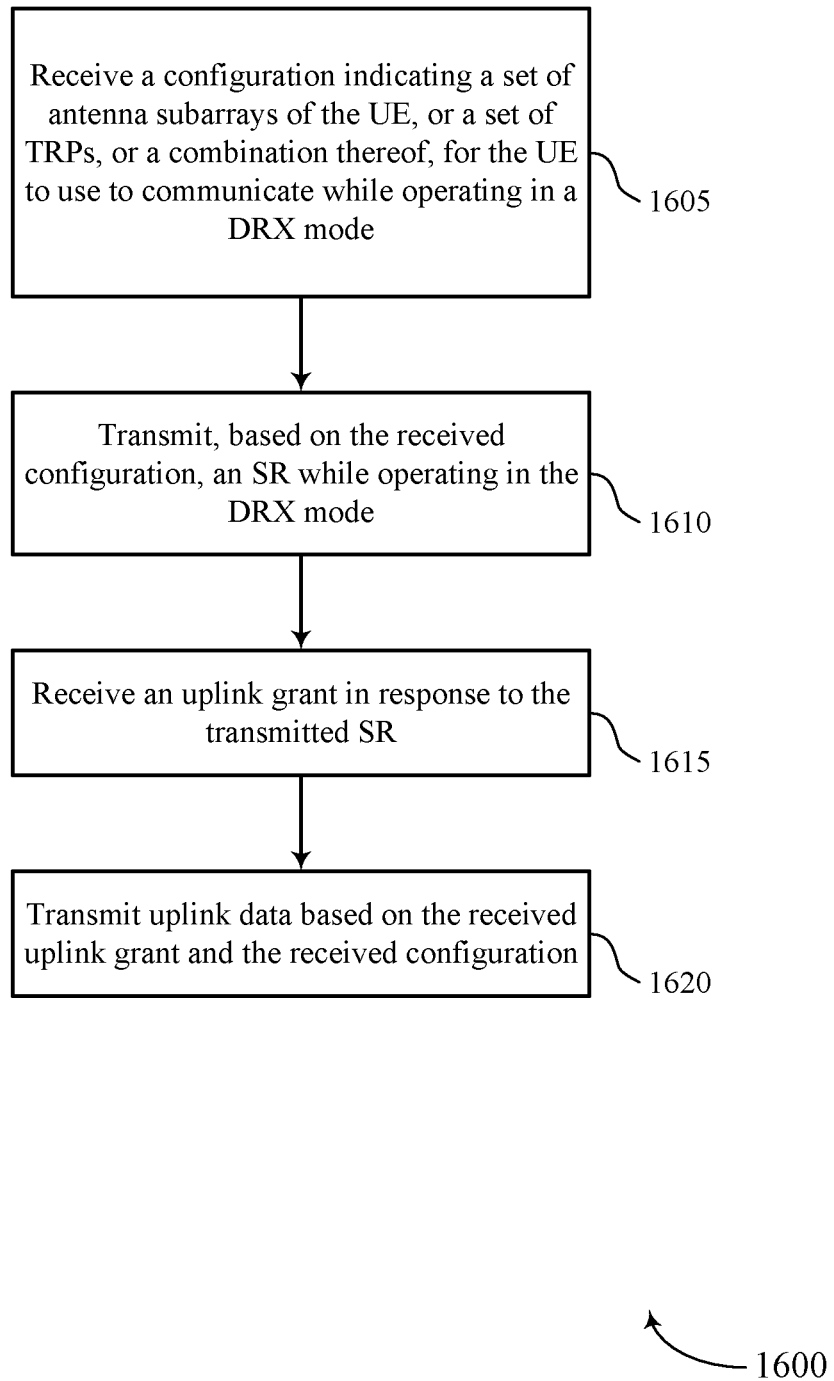
FIGS. 16 through 20 show flowcharts illustrating methods that support an SR operation in a CDRX mode in accordance with aspects of the present disclosure.

FIG. 16 shows a flowchart illustrating a method 1600 that supports SR operation in a CDRX mode in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive a configuration indicating a set of antenna subarrays of the UE, or a set of TRPs, or a combination thereof, for the UE to use to communicate while operating in a DRX mode. The operations of 1605 may be performed according to the methods described herein. In some examples, aspects of the operations of 1605 may be performed by an SR operation configuration receiver as described with reference to FIGS. 8 through 11.

At 1610, the UE may transmit, based on the received configuration, an SR while operating in the DRX mode. The operations of 1610 may be performed according to the methods described herein. In some examples, aspects of the operations of 1610 may be performed by an SR transmitter as described with reference to FIGS. 8 through 11.

At 1615, the UE may receive an uplink grant in response to the transmitted SR. The operations of 1615 may be performed according to the methods described herein. In some examples, aspects of the operations of 1615 may be performed by an uplink grant receiver as described with reference to FIGS. 8 through 11.

At 1620, the UE may transmit uplink data based on the received uplink grant and the received configuration. The operations of 1620 may be performed according to the methods described herein. In some examples, aspects of the operations of 1620 may be performed by an uplink data transmitter as described with reference to FIGS. 8 through 11.

Figure 17:
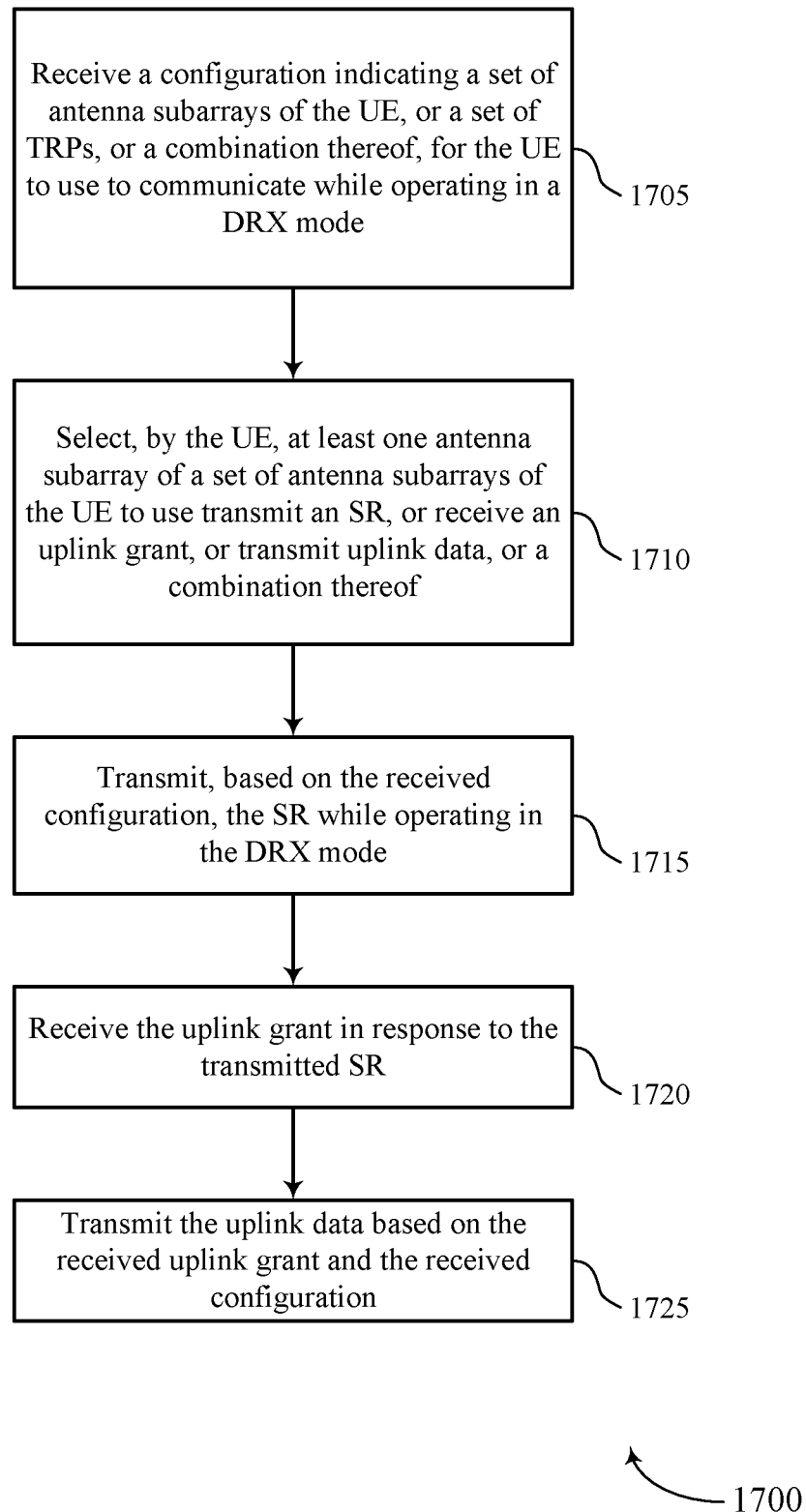

FIG. 17 shows a flowchart illustrating a method 1700 that supports SR operation in a CDRX mode in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive a configuration indicating a set of antenna subarrays of the UE, or a set of TRPs, or a combination thereof, for the UE to use to communicate while operating in a DRX mode. The operations of 1705 may be performed according to the methods described herein. In some examples, aspects of the operations of 1705 may be performed by an SR operation configuration receiver as described with reference to FIGS. 8 through 11.

At 1710, the UE may select, by the UE, at least one antenna subarray of a set of antenna subarrays of the UE to use transmit an SR, or receive an uplink grant, or transmit uplink data, or a combination thereof. The operations of 1710 may be performed according to the methods described herein. In some examples, aspects of the operations of 1710 may be performed by an antenna subarray selector as described with reference to FIGS. 8 through 11.

At 1715, the UE may transmit, based on the received configuration, the SR while operating in the DRX mode. The operations of 1715 may be performed according to the methods described herein. In some examples, aspects of the operations of 1715 may be performed by an SR transmitter as described with reference to FIGS. 8 through 11.

At 1720, the UE may receive the uplink grant in response to the transmitted SR. The operations of 1720 may be performed according to the methods described herein. In some examples, aspects of the operations of 1720 may be performed by an uplink grant receiver as described with reference to FIGS. 8 through 11.

At 1725, the UE may transmit the uplink data based on the received uplink grant and the received configuration. The operations of 1725 may be performed according to the methods described herein. In some examples, aspects of the operations of 1725 may be performed by an uplink data transmitter as described with reference to FIGS. 8 through 11.

Figure 18:
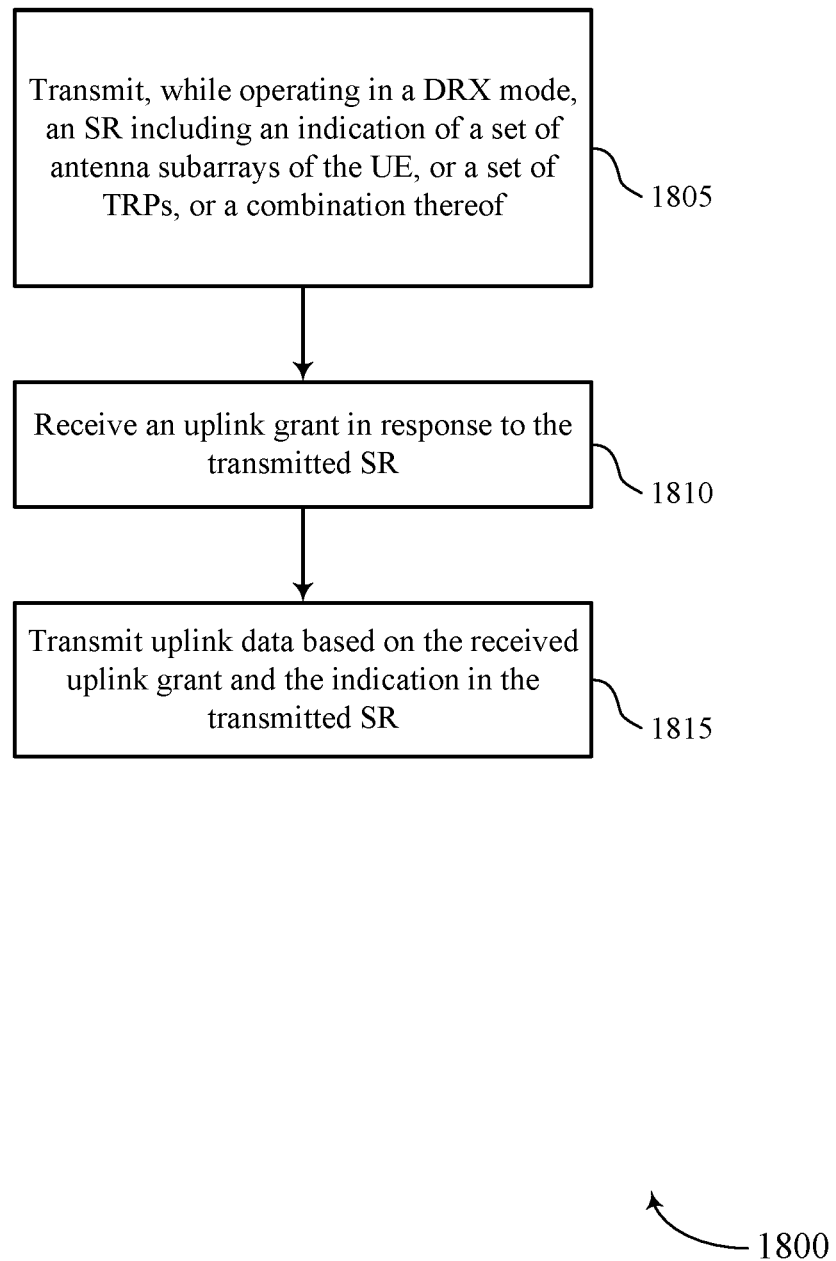

FIG. 18 shows a flowchart illustrating a method 1800 that supports SR operation in a CDRX mode in accordance with aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may transmit, while operating in a DRX mode, an SR including an indication of a set of antenna subarrays of the UE, or a set of TRPs, or a combination thereof. The operations of 1805 may be performed according to the methods described herein. In some examples, aspects of the operations of 1805 may be performed by an SR transmitter as described with reference to FIGS. 8 through 11.

At 1810, the UE may receive an uplink grant in response to the transmitted SR. The operations of 1810 may be performed according to the methods described herein. In some examples, aspects of the operations of 1810 may be performed by an uplink grant receiver as described with reference to FIGS. 8 through 11.

At 1815, the UE may transmit uplink data based on the received uplink grant and the indication in the transmitted SR. The operations of 1815 may be performed according to the methods described herein. In some examples, aspects of the operations of 1815 may be performed by an uplink data transmitter as described with reference to FIGS. 8 through 11.

Figure 19:
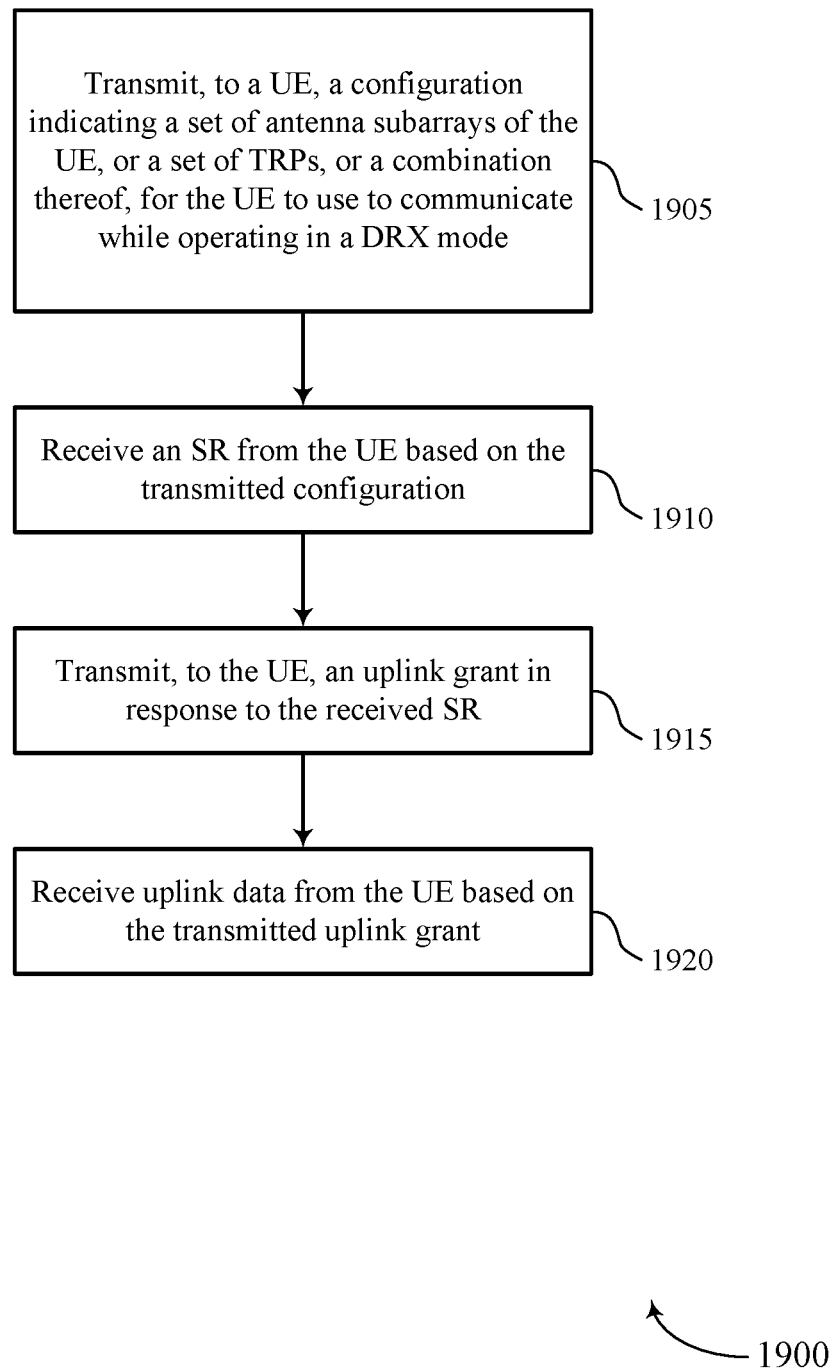

FIG. 19 shows a flowchart illustrating a method 1900 that supports SR operation in a CDRX mode in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a configuration indicating a set of antenna subarrays of the UE, or a set of TRPs, or a combination thereof, for the UE to use to communicate while operating in a DRX mode. The operations of 1905 may be performed according to the methods described herein. In some examples, aspects of the operations of 1905 may be performed by a configuration transmitter as described with reference to FIGS. 12 through 15.

At 1910, the base station may receive an SR from the UE based on the transmitted configuration. The operations of 1910 may be performed according to the methods described herein. In some examples, aspects of the operations of 1910 may be performed by an SR receiver as described with reference to FIGS. 12 through 15.

At 1915, the base station may transmit, to the UE, an uplink grant in response to the received SR. The operations of 1915 may be performed according to the methods described herein. In some examples, aspects of the operations of 1915 may be performed by an uplink grant transmitter as described with reference to FIGS. 12 through 15.

At 1920, the base station may receive uplink data from the UE based on the transmitted uplink grant. The operations of 1920 may be performed according to the methods described herein. In some examples, aspects of the operations of 1920 may be performed by an uplink data receiver as described with reference to FIGS. 12 through 15.

Figure 20:
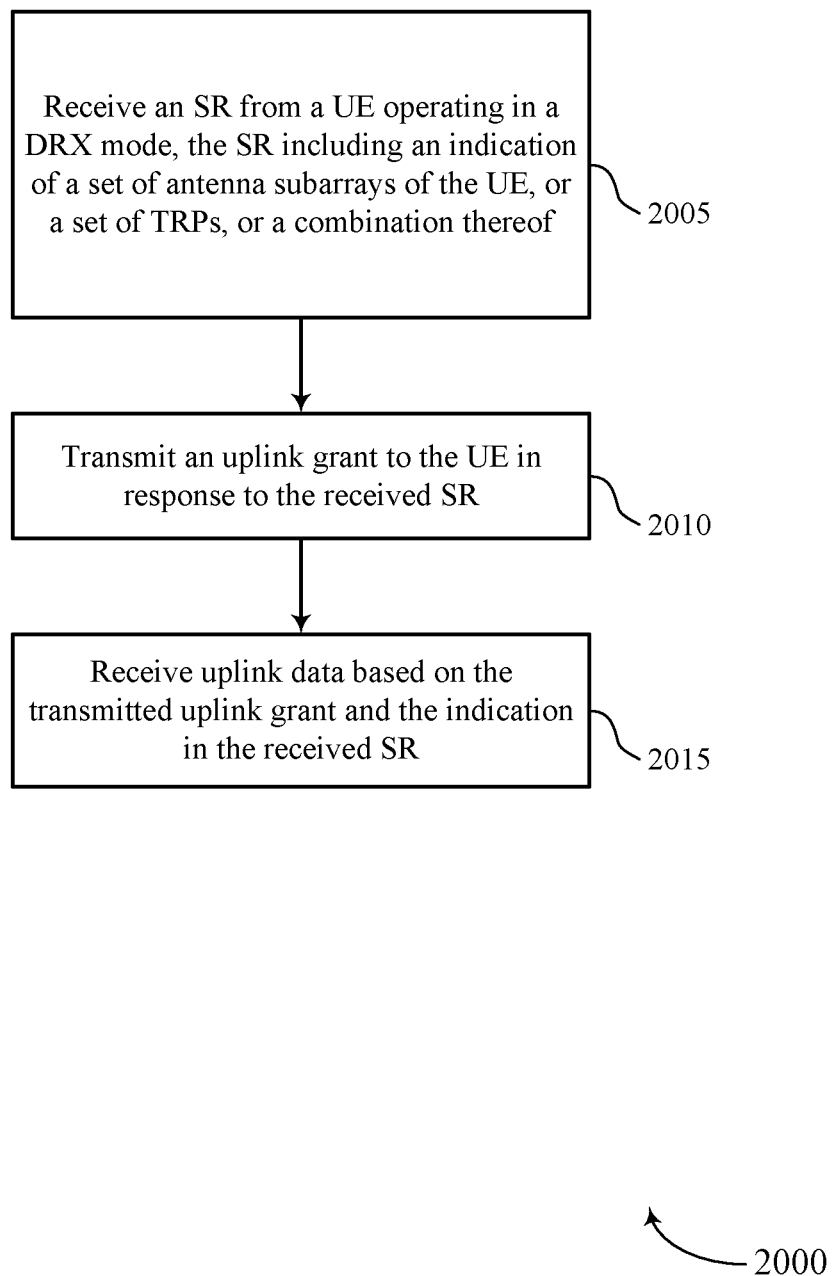

FIG. 20 shows a flowchart illustrating a method 2000 that supports SR operation in a CDRX mode in accordance with aspects of the present disclosure. The operations of method 2000 may be implemented by a base station 105 or its components as described herein. For example, the operations of method 2000 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may receive an SR from a UE operating in a DRX mode, the SR including an indication of a set of antenna subarrays of the UE, or a set of TRPs, or a combination thereof. The operations of 2005 may be performed according to the methods described herein. In some examples, aspects of the operations of 2005 may be performed by an SR receiver as described with reference to FIGS. 12 through 15.

At 2010, the base station may transmit an uplink grant to the UE in response to the received SR. The operations of 2010 may be performed according to the methods described herein. In some examples, aspects of the operations of 2010 may be performed by an uplink grant transmitter as described with reference to FIGS. 12 through 15.

At 2015, the base station may receive uplink data based on the transmitted uplink grant and the indication in the received SR. The operations of 2015 may be performed according to the methods described herein. In some examples, aspects of the operations of 2015 may be performed by an uplink data receiver as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000 or Universal Terrestrial Radio Access (UTRA). CDMA2000 covers IS-2000, IS-95, and IS-856 standards. IS-2000 Releases may be commonly referred to as CDMA2000 1× or 1×. IS-856 (TIA-856) is commonly referred to as CDMA2000 1×EV-DO or High Rate Packet Data (HRPD). UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, or Flash-OFDM. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (for example, two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving a configuration indicating a set of antenna subarrays of the UE, or a set of transmission reception points, or a combination thereof, for the UE to use to communicate while operating in a discontinuous reception mode;
transmitting, based at least in part on the received configuration, a scheduling request while operating in the discontinuous reception mode;
receiving an uplink grant in response to the transmitted scheduling request; and
transmitting uplink data based at least in part on the received uplink grant and the received configuration.

2. The method of claim 1, wherein transmitting the scheduling request comprises transmitting the scheduling request to a plurality of transmission reception points using a plurality of antenna subarrays of the UE, wherein the set of transmission reception points of the UE comprise the plurality of transmission reception points, and the set of antenna subarrays comprise the plurality of antenna subarrays.

3. The method of claim 1, wherein transmitting the scheduling request comprises transmitting the scheduling request using the set of antenna subarrays indicated by the received configuration, the set of antenna subarrays comprising a subset of a plurality of antenna subarrays of the UE.

4. The method of claim 1, wherein receiving the configuration comprises receiving the configuration in one or more of radio resource control signaling, downlink control information (DCI), or a media access control (MAC) control element.

5. The method of claim 1, further comprising selecting, by the UE, at least one antenna subarray of a plurality of antenna subarrays of the UE to use to perform one or more of transmitting the scheduling request, receiving the uplink grant, or transmitting the uplink data.

6. The method of claim 1, wherein receiving the uplink grant in response to the transmitted scheduling request comprises:
receiving, from a first transmission reception point of the set of transmission reception points, the uplink grant for the first transmission reception point in response to the transmitted scheduling request; and
receiving, from a second transmission reception point of the set of transmission reception points, an uplink grant for the second transmission reception point in response to the transmitted scheduling request.

7. The method of claim 1, wherein the set of transmission reception points comprises a plurality of transmission reception points, the method further comprising receiving, from each transmission reception point of the plurality of transmission reception points, an uplink grant for the transmission reception point in response to the transmitted scheduling request.

8. The method of claim 1, wherein the scheduling request is transmitted to a first transmission reception point of the set of transmission reception points, and the uplink grant is received from the first transmission reception point in response to the transmitted scheduling request.

9. The method of claim 1, wherein the set of transmission reception points comprises a plurality of transmission reception points, and transmitting the uplink data comprises transmitting uplink data to each of the plurality of transmission reception points.

10. The method of claim 1, wherein transmitting the uplink data comprises:
identifying one or more transmission reception points of the set of transmission reception points as having transmitted an uplink grant in response to the transmitted scheduling request; and
transmitting, based at least in part on the identifying, uplink data to the one or more transmission reception points.

11. A method for wireless communication at a user equipment (UE), comprising:
- transmitting, while operating in a discontinuous reception mode, a scheduling request including an indication of a set of antenna subarrays of the UE, or a set of transmission reception points, or a combination thereof;
- receiving an uplink grant in response to the transmitted scheduling request; and
- transmitting uplink data based at least in part on the received uplink grant and the indication in the transmitted scheduling request.

12. The method of claim 11, wherein the set of transmission reception points comprises a plurality of transmission reception points, the method further comprising transmitting, based at least in part on the received uplink grant and the indication in the transmitted scheduling request, uplink data to the plurality of transmission reception points using a plurality of antenna subarrays of the UE, the set of antenna subarrays comprising the plurality of antenna subarrays.

13. The method of claim 11, wherein receiving the uplink grant in response to the transmitted scheduling request comprises receiving the uplink grant using the set of antenna subarrays of the UE indicated in the transmitted scheduling request.

14. The method of claim 11, further comprising:
- determining a channel quality associated with one or more of each of the set of transmission reception points or each of the set of antenna subarrays of the UE; and
- determining one or more of the set of transmission reception points or the set of antenna subarrays based at least in part on the determined channel quality, wherein the transmitted scheduling request indicates the determined set of transmission reception points or the determined set of antenna subarrays.

15. A method for wireless communication at a base station, comprising:
- transmitting, to a user equipment (UE), a configuration indicating a set of antenna subarrays of the UE, or a set of transmission reception points, or a combination thereof, for the UE to use to communicate while operating in a discontinuous reception mode;
- receiving a scheduling request from the UE based at least in part on the transmitted configuration;
- transmitting, to the UE, an uplink grant in response to the received scheduling request; and
- receiving uplink data from the UE based at least in part on the transmitted uplink grant.

16. The method of claim 15, wherein receiving the scheduling request comprises receiving the scheduling request via a plurality of transmission reception points, wherein each of the plurality of transmission reception points monitor for scheduling requests from the UE.

17. The method of claim 15, wherein receiving the scheduling request comprises receiving the scheduling request via one transmission reception point of the set of transmission reception points, wherein each of the set of transmission reception points monitor for scheduling requests from the UE.

18. The method of claim 15, wherein receiving the scheduling request comprises:
- identifying an anchor transmission reception point of the set of transmission reception points, wherein the anchor transmission reception point monitors for scheduling requests from the UE; and
- receiving the scheduling request via the anchor transmission reception point.

19. The method of claim 15, wherein the uplink grant is transmitted via a first transmission reception point of the set of transmission reception points in response to the received scheduling request, the method further comprising transmitting, via a second transmission reception point of the set of transmission reception points in response to the received scheduling request, a second uplink grant for the second transmission reception point.

20. The method of claim 15, wherein the scheduling request is received via a first transmission reception point of the set of transmission reception points, and the uplink grant is transmitted via the first transmission reception point in response to the received scheduling request.

21. The method of claim 20, further comprising determining to refrain from transmitting an uplink grant via a second transmission reception point of the set of transmission reception points based at least in part on determining that the base station failed to receive a second scheduling request via the second transmission reception point.

22. The method of claim 15, wherein receiving the uplink data comprises receiving uplink data via each of a plurality of transmission reception points, wherein the set of transmission reception points comprises the plurality of transmission reception points.

23. The method of claim 15, wherein receiving the uplink data comprises:
- identifying one or more transmission reception points of the set of transmission reception points as having transmitted an uplink grant in response to the received scheduling request; and
- receiving, based at least in part on the identifying, uplink data from the UE via the one or more transmission reception points.

24. A method for wireless communication at a base station, comprising:
- receiving a scheduling request from a user equipment (UE) operating in a discontinuous reception mode, the scheduling request including an indication of a set of antenna subarrays of the UE, or a set of transmission reception points, or a combination thereof;
- transmitting an uplink grant to the UE in response to the received scheduling request; and
- receiving uplink data based at least in part on the transmitted uplink grant and the indication in the received scheduling request.

25. The method of claim 24, wherein receiving the uplink data comprises receiving, based at least in part on the transmitted uplink grant and the indication in the received scheduling request, uplink data from the UE via a plurality of transmission reception points, the set of transmission reception points comprising the plurality of transmission reception points.

26. The method of claim 24, wherein the scheduling request is received via a second transmission reception point of the set of transmission reception points different than a first transmission reception point of the set of transmission reception points used to receive the uplink data.

27. The method of claim 24, wherein transmitting the uplink grant in response to the received scheduling request comprises transmitting the uplink grant via at least one of the set of transmission reception points indicated in the received scheduling request.

28. The method of claim 27, further comprising determining one transmission reception point of the set of transmission reception points indicated in the received scheduling request, the uplink grant transmitted via the determined one transmission reception point.

29. The method of claim 27, further comprising determining a plurality of transmission reception points of the set of transmission reception points indicated in the received scheduling request, the uplink grant transmitted via the determined plurality of transmission reception points.

30. The method of claim 24, wherein the indicated set of transmission reception points are determined based at least in part on a channel quality associated with each of the set of transmission reception points, or the set of antenna subarrays, or a combination thereof.

* * * * *